(12) United States Patent
Baitinger et al.

(10) Patent No.: US 11,589,515 B2
(45) Date of Patent: Feb. 28, 2023

(54) SEED FULFILLMENT SYSTEM

(71) Applicant: Monsanto Technology LLC, St. Louis, MO (US)

(72) Inventors: David J. Baitinger, Ogden, IA (US); Brian L. Hahn, West Des Moines, IA (US); Andrew Maddux, West Des Moines, IA (US); Eric Thompson, West Des Moines, IA (US); Roger A. Weyhrich, Boone, IA (US)

(73) Assignee: Monsanto Technology LLC, St. Louis, MO (US)

(*) Notice: Subject to any disclaimer, the term of this patent is extended or adjusted under 35 U.S.C. 154(b) by 234 days.

(21) Appl. No.: 16/641,600

(22) PCT Filed: Aug. 31, 2018

(86) PCT No.: PCT/US2018/049211
§ 371 (c)(1),
(2) Date: Feb. 24, 2020

(87) PCT Pub. No.: WO2019/046788
PCT Pub. Date: Mar. 7, 2019

(65) Prior Publication Data
US 2021/0153438 A1 May 27, 2021

Related U.S. Application Data

(60) Provisional application No. 62/552,876, filed on Aug. 31, 2017.

(51) Int. Cl.
*A01F 12/50* (2006.01)
*B65B 1/30* (2006.01)
(Continued)

(52) U.S. Cl.
CPC ............... *A01F 12/50* (2013.01); *B65B 1/30* (2013.01); *B65B 25/02* (2013.01); *B65B 35/10* (2013.01);
(Continued)

(58) Field of Classification Search
CPC ...... G06Q 10/087; G06Q 10/08; A01F 12/50; B65B 1/30; B65B 7/16; B65B 35/00;
(Continued)

(56) References Cited

U.S. PATENT DOCUMENTS 3,770,164 A * 11/1973 Hembree ............... A01C 7/044
221/211
5,963,453 A * 10/1999 East ..................... G07F 17/0092
53/493

(Continued)

OTHER PUBLICATIONS

Extended European Search Report dated Apr. 7, 2021, Application No. 18852533.1-1016 / 3676771 PCT/US2018049211, 7 pages.
(Continued)

*Primary Examiner* — Hemant Desai
*Assistant Examiner* — Mobeen Ahmed
(74) *Attorney, Agent, or Firm* — Harness, Dickey & Pierce, P.L.C.

(57) ABSTRACT

A seed fulfillment system is an automated system for sorting and delivering different types of seeds from different seed containers to a shipping-container loading system which loads shipping containers with the seeds. The seed fulfillment system includes an intermediary-container handling system which conveys intermediary containers of seeds from a filling system to a shipping-container loading system.

21 Claims, 19 Drawing Sheets

(51) Int. Cl.
*B65B 35/10* (2006.01)
*B65B 25/02* (2006.01)
*B65B 57/20* (2006.01)
*B65G 47/08* (2006.01)
*B65G 47/46* (2006.01)
*B65B 65/00* (2006.01)
*B65G 37/00* (2006.01)
*B65B 7/16* (2006.01)
*B65B 35/30* (2006.01)
*G06Q 10/087* (2023.01)

(52) U.S. Cl.
CPC ............ *B65B 57/20* (2013.01); *B65B 65/003* (2013.01); *B65G 47/08* (2013.01); *B65G 47/46* (2013.01); *B65B 7/16* (2013.01); *B65B 35/30* (2013.01); *B65B 65/00* (2013.01); *B65G 37/00* (2013.01); *G06Q 10/087* (2013.01)

(58) Field of Classification Search
CPC ......... B65B 35/10; B65B 35/28; B65B 35/30; B65B 57/20; B65B 65/00; B65B 65/003; B65G 37/00; B65G 47/08; B65G 47/46
See application file for complete search history.

(56) References Cited

U.S. PATENT DOCUMENTS

| | | | |
|---|---|---|---|
| 6,015,064 A | 1/2000 | Liu | |
| 7,584,592 B2 * | 9/2009 | Gabrielson | B65B 55/20 53/445 |
| 7,998,669 B2 * | 8/2011 | Deppermann | A01C 1/00 47/14 |
| 8,943,785 B2 * | 2/2015 | Blickhan | A01F 11/00 53/500 |
| 10,699,421 B1 * | 6/2020 | Cherevatsky | G06K 9/623 |
| 10,907,129 B2 * | 2/2021 | Opel | C12M 37/02 |
| 2002/0144458 A1 * | 10/2002 | Hunter | A01H 1/02 47/14 |
| 2003/0116068 A1 * | 6/2003 | Sauder | A01C 21/005 111/180 |
| 2005/0004700 A1 * | 1/2005 | DiMaggio | G16H 20/13 700/213 |
| 2005/0060958 A1 * | 3/2005 | Harmon | B65B 1/46 53/111 R |
| 2005/0092389 A1 * | 5/2005 | Mazur | B65B 65/003 141/100 |
| 2005/0171813 A1 * | 8/2005 | Jordan | G07F 17/0092 700/231 |
| 2005/0224510 A1 * | 10/2005 | Remis | B65B 5/103 221/69 |
| 2006/0042527 A1 * | 3/2006 | Deppermann | C12Q 1/6895 111/171 |
| 2007/0172396 A1 * | 7/2007 | Neeper | G01N 35/0099 422/400 |
| 2008/0000815 A1 * | 1/2008 | Deppermann | B07C 5/3425 209/552 |
| 2008/0092488 A1 * | 4/2008 | Gabrielsen | B65B 55/20 53/115 |
| 2009/0032441 A1 * | 2/2009 | Corak | B07C 5/3425 435/6.12 |
| 2010/0198392 A1 * | 8/2010 | Eliuk | G07F 11/70 700/216 |
| 2010/0281829 A1 * | 11/2010 | Leu | B65C 1/026 53/471 |
| 2011/0047042 A1 * | 2/2011 | Blickhan | A01F 11/00 705/26.25 |
| 2011/0305545 A1 * | 12/2011 | Davis | B25J 15/00 414/800 |
| 2012/0003074 A1 * | 1/2012 | Rubatino | A01C 1/06 414/800 |
| 2012/0137636 A1 * | 6/2012 | Ours | B65B 1/02 493/51 |
| 2012/0177473 A1 * | 7/2012 | Smith | G07F 17/0092 414/744.3 |
| 2014/0157732 A1 * | 6/2014 | Gasber | B65B 25/008 53/235 |
| 2014/0165506 A1 * | 6/2014 | Deppermann | B65B 65/003 53/471 |
| 2014/0250829 A1 * | 9/2014 | Terzini | G07F 11/26 53/131.2 |
| 2015/0177110 A1 * | 6/2015 | Cargill | B65B 1/16 414/331.02 |
| 2016/0166998 A1 * | 6/2016 | Sacchi | B01F 35/881 414/21 |
| 2016/0167227 A1 * | 6/2016 | Wellman | B25J 9/0084 901/3 |
| 2016/0194153 A1 | 7/2016 | Issing et al. | |
| 2017/0080566 A1 * | 3/2017 | Stubbs | B25J 9/1682 |
| 2017/0121113 A1 * | 5/2017 | Wagner | B25J 9/0093 |
| 2017/0136632 A1 * | 5/2017 | Wagner | B25J 9/1612 |
| 2017/0190510 A1 * | 7/2017 | Porat | B64F 1/32 |
| 2017/0225330 A1 * | 8/2017 | Wagner | B25J 15/0616 |
| 2017/0323129 A1 * | 11/2017 | Davidson | G05D 1/0234 |
| 2018/0075506 A1 * | 3/2018 | Burkhard | G06Q 30/0635 |
| 2018/0082757 A1 * | 3/2018 | Chambers | G07F 11/165 |
| 2018/0317375 A1 * | 11/2018 | Weis | A01H 1/04 |
| 2019/0080790 A1 * | 3/2019 | Patel | B65B 35/32 |
| 2020/0000007 A1 * | 1/2020 | Barrick | A01C 1/025 |
| 2021/0035400 A1 * | 2/2021 | Flynn | G07F 11/54 |
| 2021/0153438 A1 * | 5/2021 | Baitinger | B65B 25/02 |
| 2021/0311082 A1 * | 10/2021 | Tesluk | G01N 35/00732 |

OTHER PUBLICATIONS

International Search Report and Written Opinion for PCT/US2018/049211, dated Oct. 18, 2018, 9 pages, United States.

* cited by examiner

SEED FULFILLMENT SYSTEM

FIELD OF THE DISCLOSURE

The present disclosure generally relates to seed fulfillment, and more particularly, to a system and method for handling seeds from inventory to packaging within a seed fulfillment system.

BACKGROUND OF THE DISCLOSURE

In agricultural research, selected varieties of seeds (e.g., different lines or hybrids) are planted in experimental plots under selected parameters (i.e., variables), including soil type, climatic zones, different management practices such as tillage or fertilizer rates, etc. Numerous varieties of harvested seeds may come into a fulfillment center (e.g., a warehouse) from many geographical locations at different times. Thus, assembling varieties of seed from different origins, comingling those materials, and packaging for distribution to a large number of experimental plot locations is difficult to achieve in an efficient and effective manner.

SUMMARY OF THE DISCLOSURE

In one aspect, a seed fulfillment system generally comprises a seed inventory handling system configured to handle inventory containers containing different seed types; an intermediary-container filling system configured to fill intermediary containers with selected seed types from the inventory containers; a shipping-container loading system configured to load shipping containers with the seeds in the intermediary containers; and an intermediary-container handling system configured to convey the filled intermediary containers from the intermediary-container filling system to the shipping-container loading system.

In another aspect, an intermediary-container handling system includes one or both of an accumulating sortation table and a filling sortation table.

In another aspect, the intermediary container may include a container body and a bar code extending 360 degrees about a circumference of the container body.

DETAILED DESCRIPTION OF THE DISCLOSURE

In general, the present disclosure is directed to a seed fulfillment system. In one embodiment, selected seeds from inventory are loaded in individual intermediary containers, which are handled by an intermediary-container handling system. In one or more embodiments, the intermediary-container handling system functions as an intermediary between an inventory handling system and an automated shipping-container loading system to logistically deliver the filled intermediary containers to the shipping-container loading system. In one or more examples, the automated shipping-container loading system loads seeds from the filled intermediary containers into shipping containers, which may comprise a cassette defining individual cells. In one or more examples, the seed fulfillment system also includes an automated inventory handling system in which an inventory of seeds is stored in bulk in totes (broadly, inventory containers). The seed fulfillment system may also include a packaging system (e.g., palletizing system) where completed experimental sets (i.e., completed orders) are packaged for delivery to a field to be planted. In one or more embodiments, a controller controls operation of the seed fulfillment system. The controller includes a scheduler application or program that determines and optimizes the fulfillment operation based on the inventory of seeds and experimental maps (i.e., orders) accessible by the controller.

Figure 1:
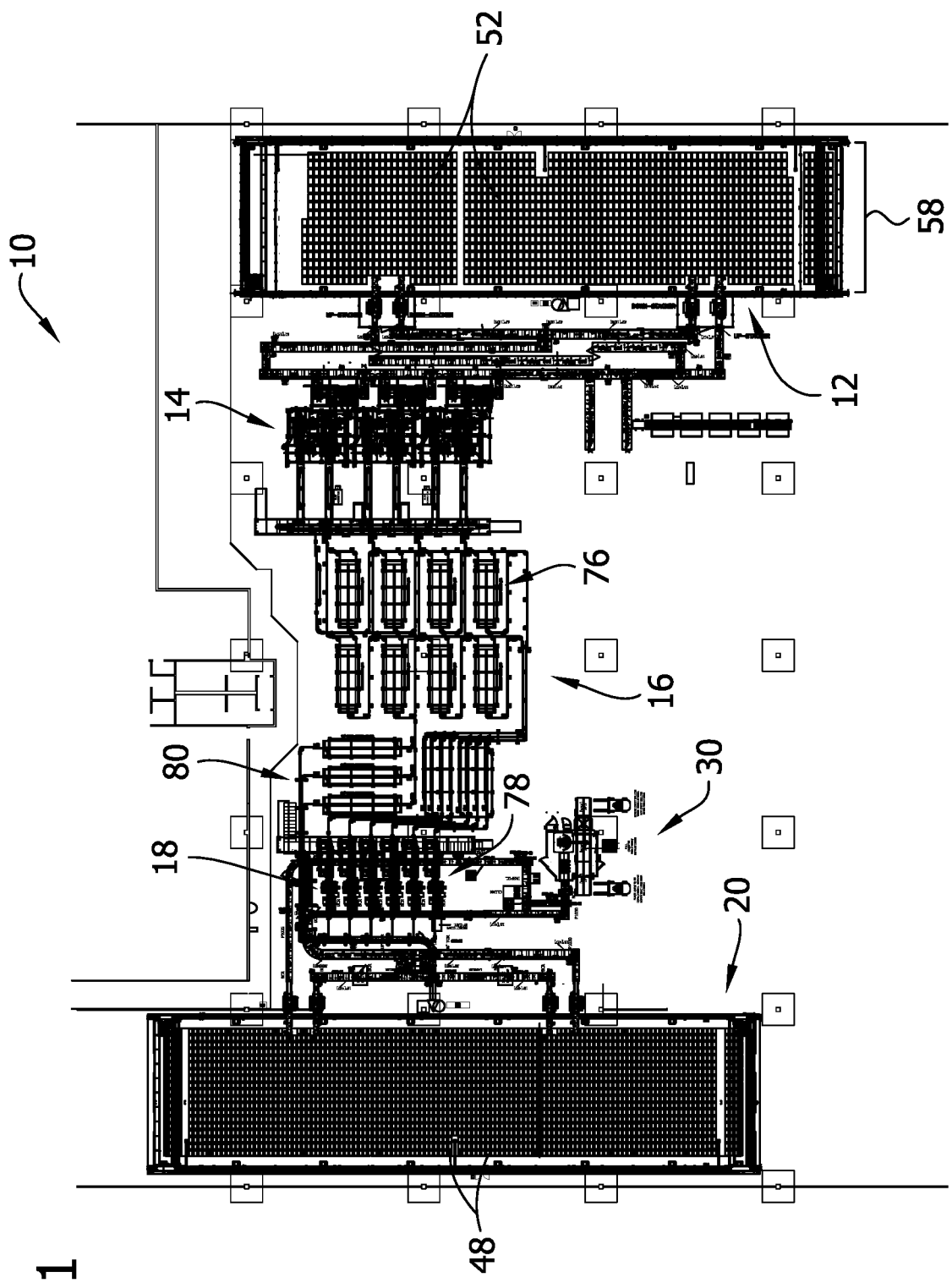
FIG. 1 is a schematic layout of one embodiment of a seed fulfillment system constructed according to the teachings of the present disclosure.
Figure 2:
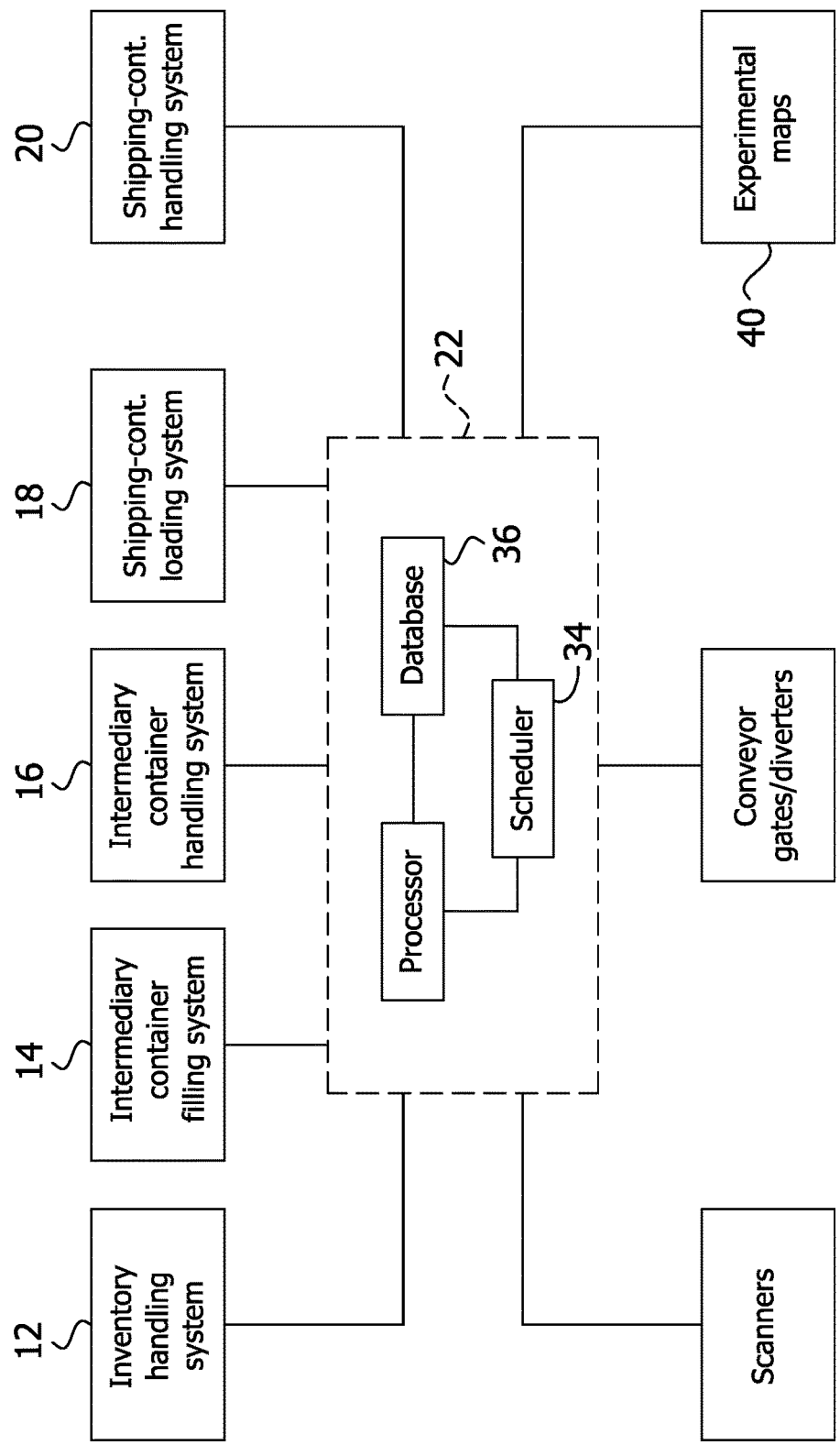
FIG. 2 is a schematic of components of the seed fulfillment system.

Referring to FIGS. 1 and 2, one embodiment of a seed fulfillment system is generally indicated at reference numeral 10. The seed fulfillment system generally includes an inventory handling system, generally indicated at 12; an intermediary-container filling system, generally indicated at 14; an intermediary-container handling system, generally indicated at reference numeral 16; a shipping-container loading system, generally indicated at reference numeral 18; and a shipping-container handling system, generally indicated at reference numeral 20. Each of the systems 12, 14, 16, 18, 20 is in communication with a programmable controller 22 (i.e., a central processing unit and a memory), which may include one or more programmable controllers. The controller 22 may comprise a central controller (i.e., a central processor unit and a memory) in communication with each of the systems 12, 14, 16, 18, 20 as illustrated. Alternatively or in addition, the controller 22 may include system controllers (i.e., a central processor unit and a memory) associated with the systems 12, 14, 16, 18, 20 and in communication with the controller(s) of one or more of the other systems and/or the central controller. Referring to FIG. 1, the seed fulfillment system 10 may also include a shipping-container packaging system, generally indicated at reference numeral 30 which may also be in communication with the controller 22 or other controller.

Each of the systems 12, 14, 16, 18, 20, 30 of the illustrated seed fulfillment system 10 may be housed in a single warehouse, for example, or in other separate buildings or housings. In other embodiments, the seed fulfillment system 10 may include additional systems and/or components. In yet other embodiments, the seed fulfillment system 10 may include the intermediary-container handling system 14, yet one or more of the other illustrated systems may be omitted. The illustrated systems may be of other designs and constructions without necessarily departing from the scope of the present invention.

In one example, the controller 22 includes a scheduler 34 (i.e., a computer program) and a database 36 (e.g., at least one database) including an inventory database having information relating to the inventory of seed. Experimental maps 40 are inputted to the controller 22. The experimental maps 40 are considered "orders" for the seed fulfillment system 10. The experimental maps 40 include information relating to the types of seeds that will be planted in desired plots of desired experimental fields. The scheduler application 34 uses the information in the experimental maps 40 and the inventory database to determine the logistics of fulfilling the orders (e.g., filling the shipping containers, such as individual cells of cassettes).

In one example, from the viewpoint of a single experimental unit for a single experimental plot, a desired type of bulk or inventory seed for the single experimental unit is picked by the inventory handling system 12. At the intermediary-container filling system 14, the picked bulk seed is counted out into an intermediary seed container, such as intermediary seed container 44 shown in FIG. 3 and described below. The intermediary-container handling system 16 handles the intermediary container 44 containing the desired quantity of seed and delivers the filled intermediary container to the shipping-container loading system 18. The shipping-container loading system 18 loads the seeds from the intermediary seed container 44 into a desired, predetermined cell of a selected shipping-container, such as one of the cells 46 of the cassette 48 shown in FIG. 4 and described below. The shipping-container handling system 20 delivers the selected shipping-container to the shipping-container loading system 18 and handles the shipping-container 34 after loading seeds (e.g., back to a shipping-container area or to the shipping-container packaging system 30 for shipment to the experimental plot location). In one example, the logistics of the seed fulfillment system 10, including the order in which inventory seed is picked, how the filled intermediary containers are handled by the intermediary-container handling system 16, and the order in which the seed is loaded from the intermediary containers into the cells 46 of the cassettes 48 is determined by the scheduler 34.

Figure 5:
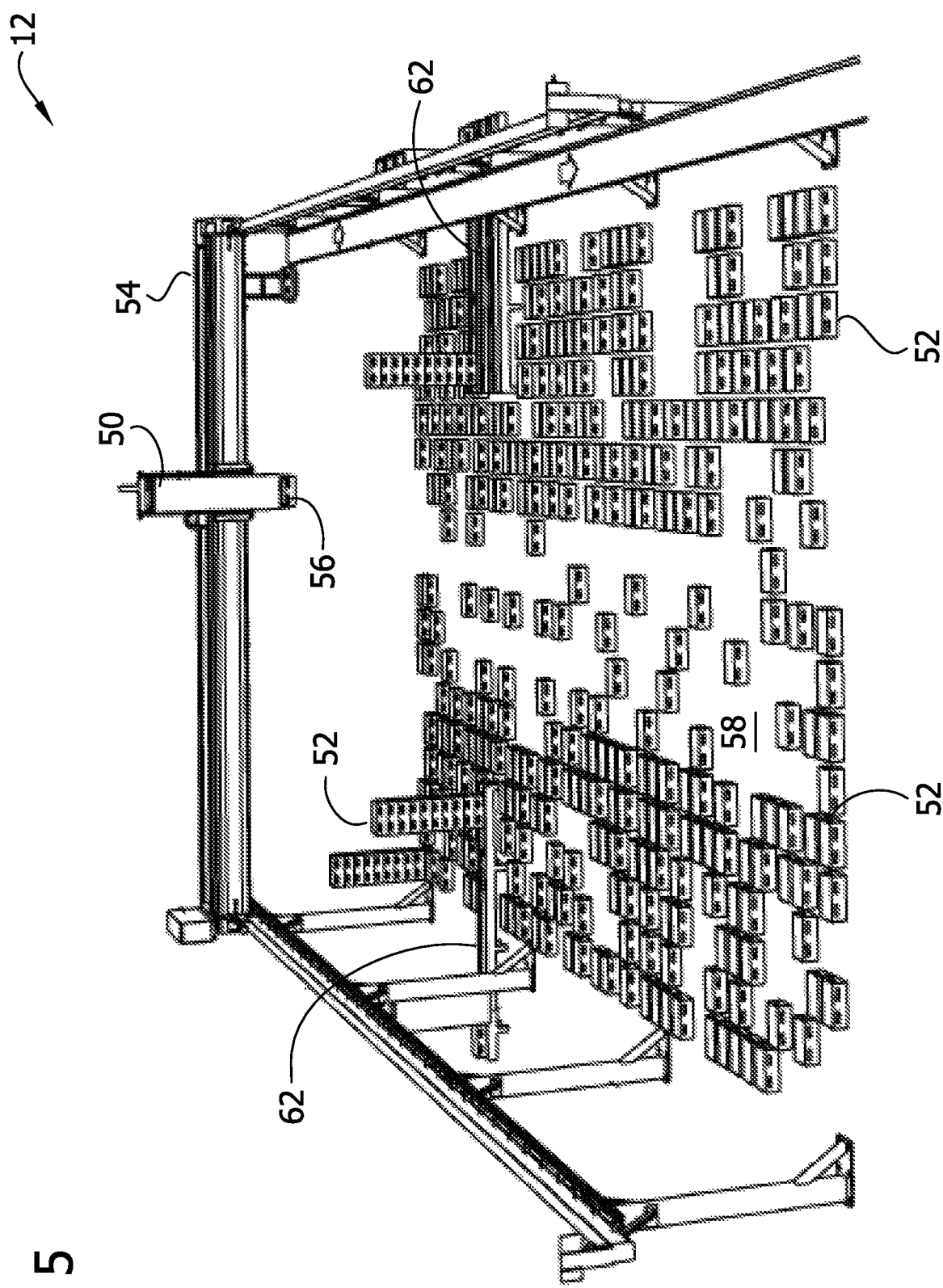
FIG. 5 is a perspective of an inventory handling system of the seed fulfillment system.
Figure 6:
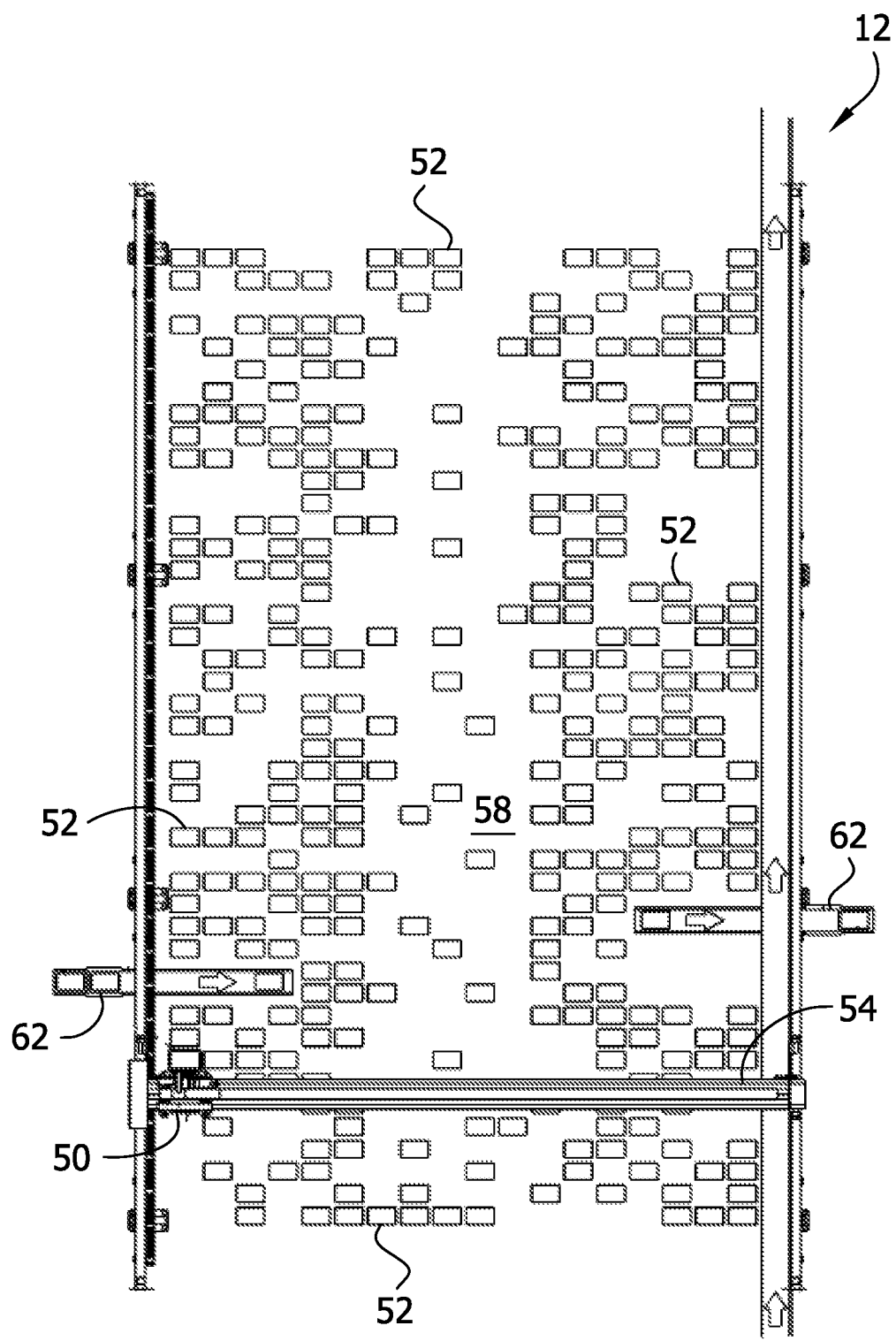
FIG. 6 is a top plan view of the inventory handling system.

Referring to FIGS. 1, 5, and 6, the illustrated inventory handling system 12 generally comprises a robot 50 (e.g., an overhead robot) configured to pick up, move, and deliver inventory containers 52 (e.g., boxes, totes, and/or bins, etc.) containing at least one bulk quantity of seeds of the same type (i.e., seeds of the same variety, hybrid, line and/or source, etc.). As an example, seeds of the same type are associated with the same seed SKU (stock keeping unit).

Each inventory container 52 may include one or more machine readable label, including but not limited to machine readable optical label, such as a bar code (e.g., matrix bar code, such as QR codes) that includes information relating to one or both of the seed SKU of the seeds contained in the inventory container. In one or more embodiments, the machine readable label may be a radiofrequency label (e.g., RFID) or other type of machine readable label. The database 36—accessible by the controller 22—may associate the information in the machine readable optical label of the inventory container with an associated seed SKU or other seed identifier. Other ways of associating the bulk seeds with the inventory 52 containers so that the inventory container in which a desired seed type is contained is accessible by the controller do not necessarily depart from the scope of the present invention.

In one example, seeds of the same type (e.g., the same variety, hybrid, line and/or source, etc.) arrive in the warehouse of seed fulfillment system 10 in packages on which identification labels are attached. The identification labels may be used as, or may be associated with, seed SKUs (stock keeping units) to identify the type of seed associated with the respective packages. In one embodiment, the identification labels are machine readable optical labels, such as bar codes (e.g., matrix bar code, such as QR codes). In another example, machine readable optical labels may be applied to the seed packages at the warehouse after arrival, using provided information relating to the type of seed in the packages. In each example, the database 36—accessible by the controller—may associate the information in the machine readable optical label of the package with an associated seed SKU or other seed identifier. In one example, the machine readable optical labels of the packages may be associated with the corresponding inventory containers 52 in which the seeds from the packages are contained. For example, the inventory containers 52 and corresponding packages of seeds may be scanned and saved as associations in the database 36 accessible by the controller.

Figure 19:
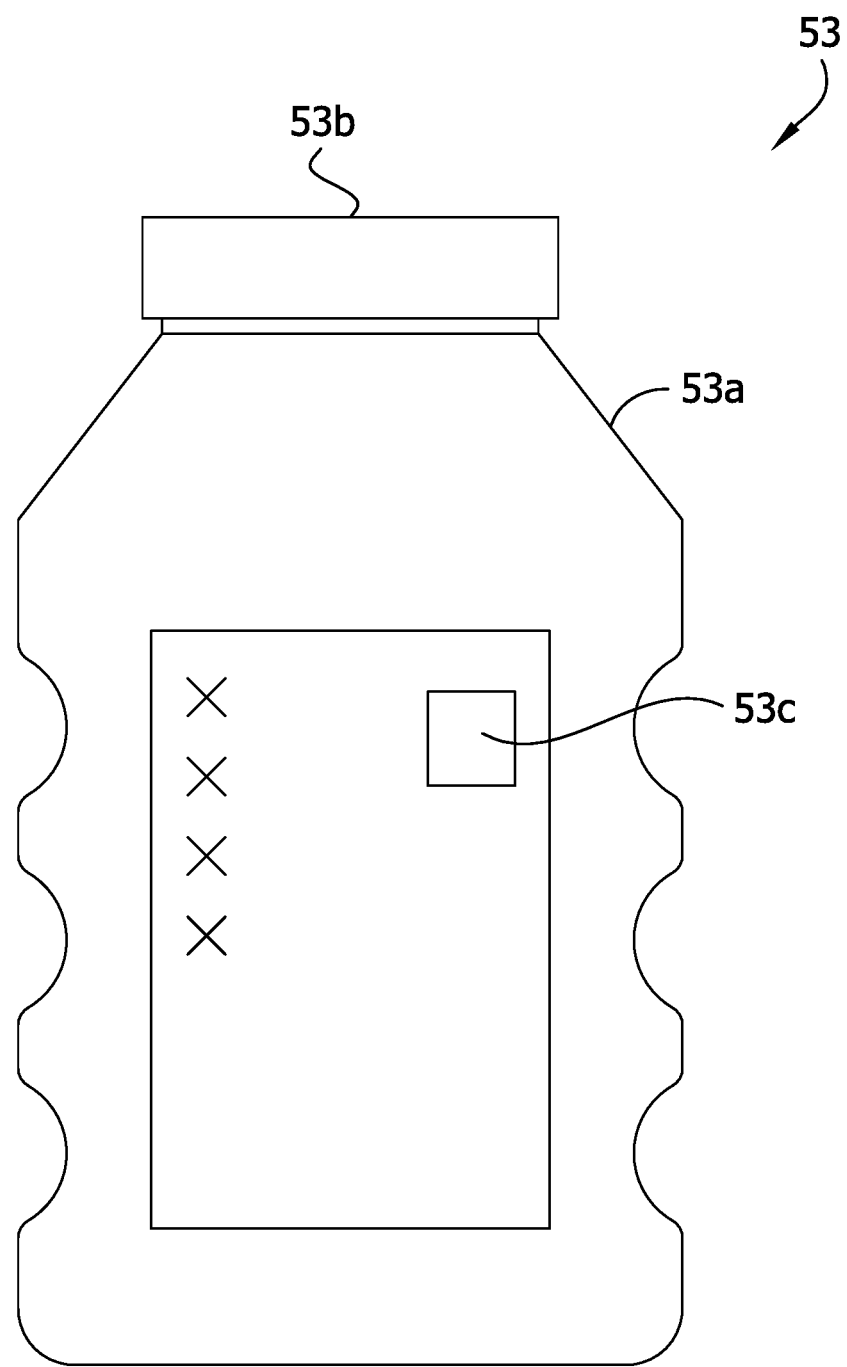
FIG. 19 is a front elevation of one embodiment of a primary seed container.

It is envisioned that one or more seed packages themselves may be placed in the inventory containers 52, thereby making one or more bulk containers within each inventory container. For example, in the illustrated embodiment, seed packages comprise primary seed containers 53 (FIG. 19) containing seeds. Each primary seed container 53 includes a body 53a containing a quantity of seeds, a lid 53b, and a label 53c (e.g., a machine readable optical label, such as a bar code (e.g., matrix bar code, such as QR code) attached to the body that identifies the type of seed in seed container and may be associated with additional information. The lid 53b is removable by a robot (e.g., a robotic arm) of the intermediary-container filling system 12, as explained below. The inventory containers 52 may arrive at the warehouse with the seed containers 53 filled with the seeds, or the seed containers with seeds may arrive separately and placed in the inventor containers. The identity of the inventory container 52 is associated with each of the seed containers 53 contained therein so that a database including the location of each seed container is included in an accessible database. In another example, the seeds in the inventory container 52 may not be contained within another container. For example, the seeds in the same SKU package may be emptied into the same inventory container 52. It is envisioned in this example that all of the seeds in the inventory container 52 will have the same seed SKU.

Referring to FIGS. 5 and 6, the illustrated robot 50 is controllable by the controller 22 and is coupled to a gantry 54. The robot 50 includes a gripper 56. The gantry 54 defines an inventory workspace 58 in which the inventory containers 52 are stacked, unstacked, and delivered. The robot 50 is movable horizontally and vertically on the gantry 54 and the gripper 56 is configured to grip or grab individual or multiple inventory containers 52. A suitable, non-limiting robot 50 and gantry 54 are described in U.S. Pat. No. 9,272,845, filed Sep. 18, 2013, the entirety of which is incorporated by reference. The inventory handling system 12 may be of other designs and configurations without necessarily departing from the scope of the present invention.

The inventory containers 52 are arranged in the inventory workspace 58 in an order stored in the database 36 (e.g., an inventory map database) accessible by the controller 22 based on the readable optical label (or other labels) associated with the inventory containers 52, for example. Accordingly, the location of each type of seed listed in inventory map database is accessible by the controller 22, and the controller is configured to control the overhead robot 50 to grab (i.e., pick) the inventory container 52 having a selected type of seed and deliver the inventory container to the intermediary-container filling system 14. For example, the inventory handling system 12 may include one or more mechanical conveyors 62 configured to deliver the picked inventory containers 52 to the intermediary-container filling system 14. In another example, the inventory handling system 12 may deliver the picked inventory containers 52 to an in-progress area where the picked inventory containers are subsequently delivered (e.g., manually delivered) to the intermediary-container filling system 14. In the illustrated embodiment, the inventory handling system 12 may include an inventory controller in communication with a central controller and controlling the robot 50 based on instructions from the central controller.

Figure 8:
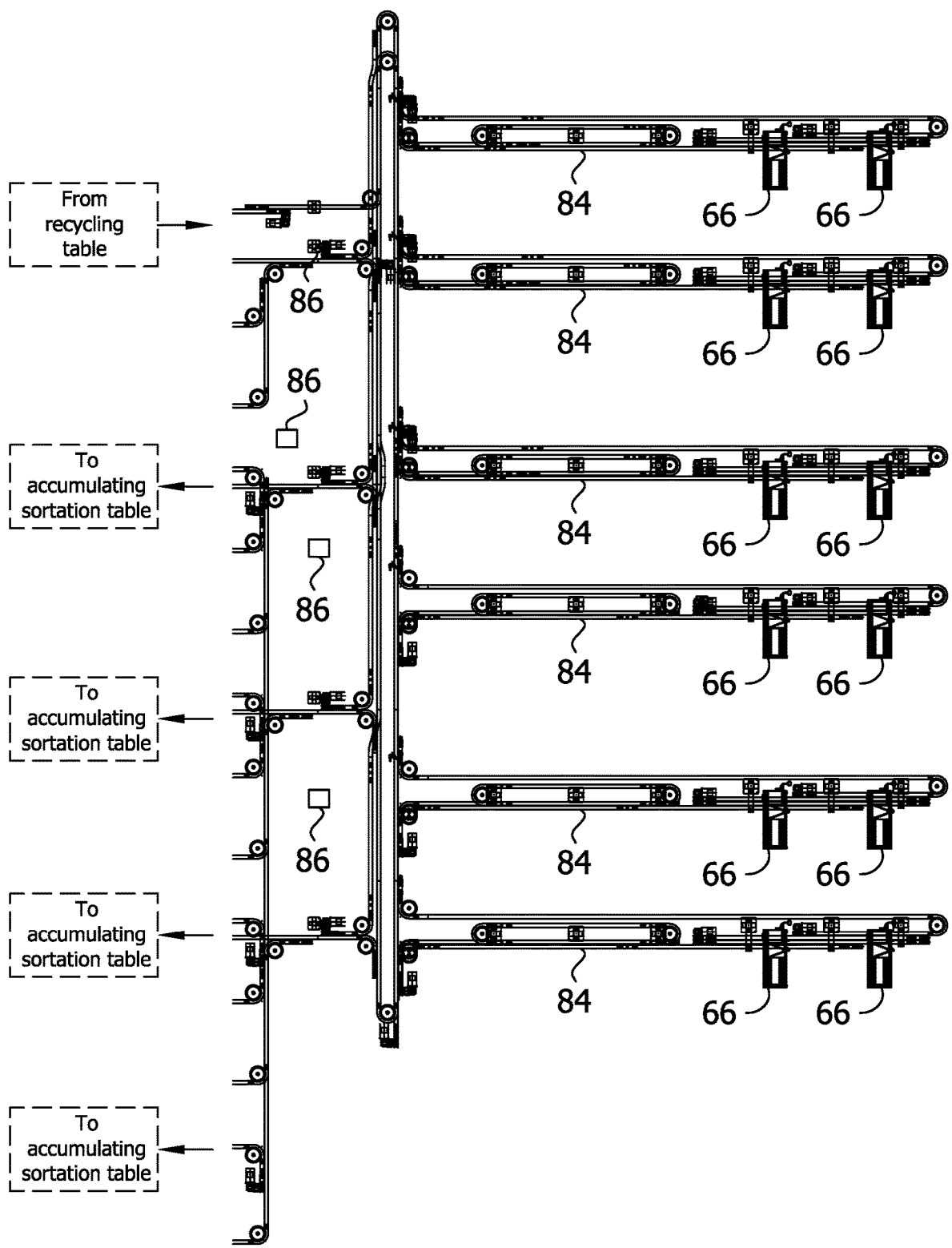
FIG. 8 is an enlarged, partial view of FIG. 7 showing the intermediary-container filling system.
Figure 18:
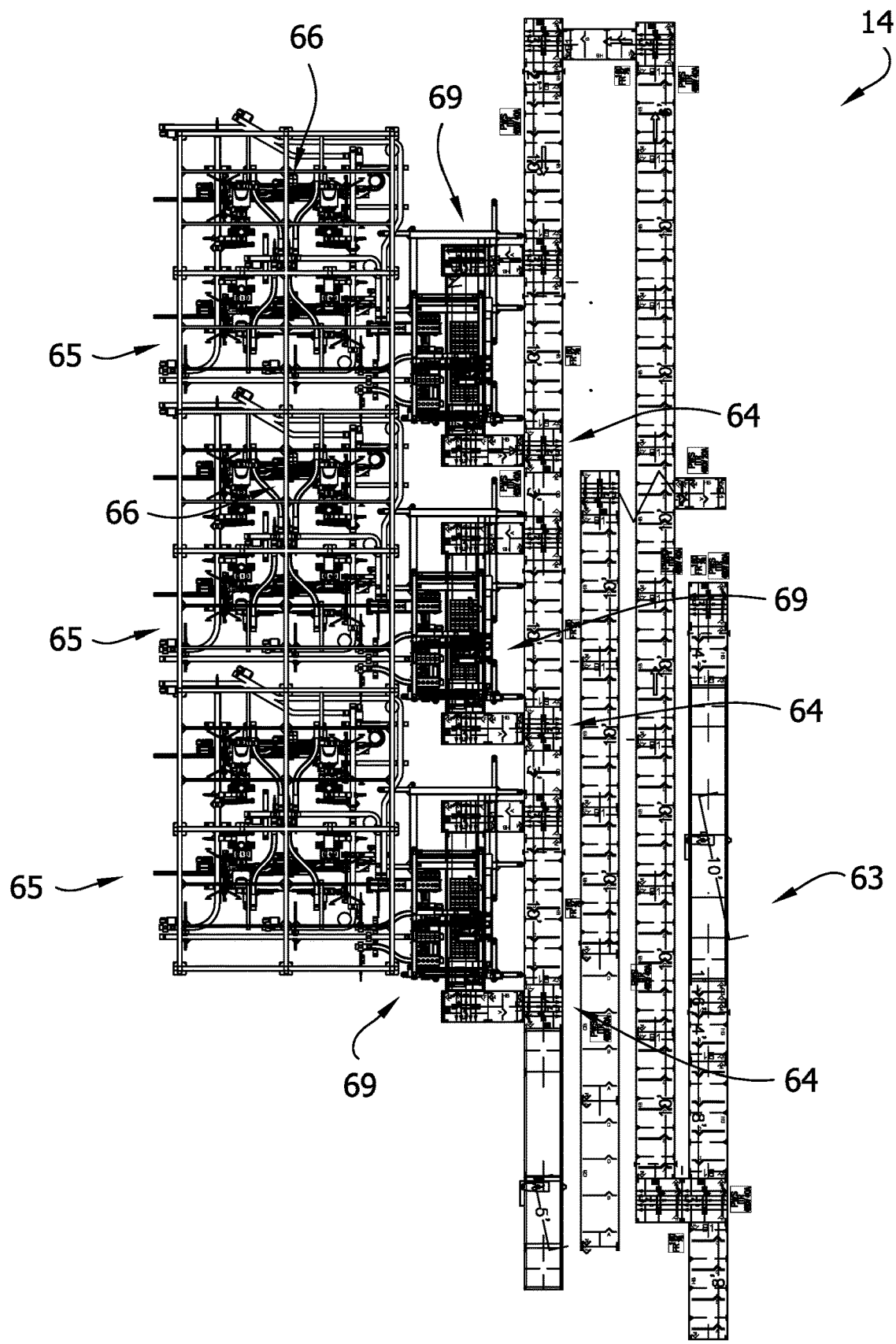
FIG. 18 is a schematic layout of a seed container handling system.

Referring to FIGS. 8 and 18, the illustrated intermediary-container filling system 14 comprises an inventory container delivery system 63, a seed container handling system 64, a seed container routing system 65, and a seed counting apparatus 66 for depositing a desired quantity of seeds into each of the intermediary containers 44. The inventory container delivery system 63 includes one or more conveyors to which the inventory handling system 12 delivers the picked inventory containers 52 holding the seed containers of seeds. The conveyors of the inventory container delivery system 63 move the containers 52 to the seed container handling system 64. The seed container handling system 64 includes a robotic arm configured to pick one or more selected seed containers from the container 52. The robotic arm is controlled by the controller. The controller accesses the database to determine the location of the desired seed container to be removed within the container 52. In one example, the robotic arm includes a suction cup which pulls the seed container upward out of the container. The robotic arm transfers the removed seed container to the seed container routing system. The seed container routing system is configured to deliver the selected seed container to the seed counting apparatus 66. The ID of each of the seed containers 53 is tracked throughout the seed container routing system 65, such as by sensors reading the machine readable code 53c of the seed container. At the seed counting apparatus 66, a robotic arm removes the lid 53b from seed container 53 (or the lid is removed by the robotic arm that pulled the seed container from the container 52), pours a quantity of the seeds into a hopper of the seed counting apparatus 66. The seed counting apparatus 66 delivers a desired number of seeds into one or more of the intermediary container 44. A suitable seed counting apparatus 66 is disclosed in U.S. Pat. No. 9,598,191, filed Nov. 26, 2014, the entirety of which is incorporated by reference in its entirety. Other types of seed counting apparatuses may be used in the intermediary-container filling system 14 without necessarily departing from the scope of the present invention. For example, the seed counting apparatus 66 may be modified such that excess seeds in the hopper that are not counted and dispensed in one or more primary seed containers 53 are recycled back, such as by a vacuum, into the seed container from which the seed was derived. In the illustrated embodiment, the intermediary-container filling system 14 includes twelve seed counters 66 for rapidly depositing a selected quantity of seeds into individual intermediary containers 44.

In the illustrated embodiment, the seed container handling system 64 includes one or more seed container queues 69. The seed containers pulled from the containers 52 may be first be delivered to a queue 69 (or accumulating area) before being conveyed to the seed counting apparatus 66 via one or more seed container conveyors. The queuing of the seed containers 53 is controlled by the controller. After a quantity of seeds is dispensed into one or more intermediary containers 44 at the seed counting apparatus 66, the primary seed container 53 may be conveyed via one of the seed container conveyors to the queue 64 or separate queue (or seed container holding area) before the seed container is placed back into the container 52 from which it was pulled. If the primary seed container 53 is empty, the seed container may be discarded. A robotic arm (e.g., an arm with a suction cup) may pick up and place the primary seed containers 53 back into the respective containers 52. The containers 52 are then conveyed back, via one or more container conveyors, to the inventory handling system 12 where the containers are placed back in the inventory workspace 58.

Figure 3:
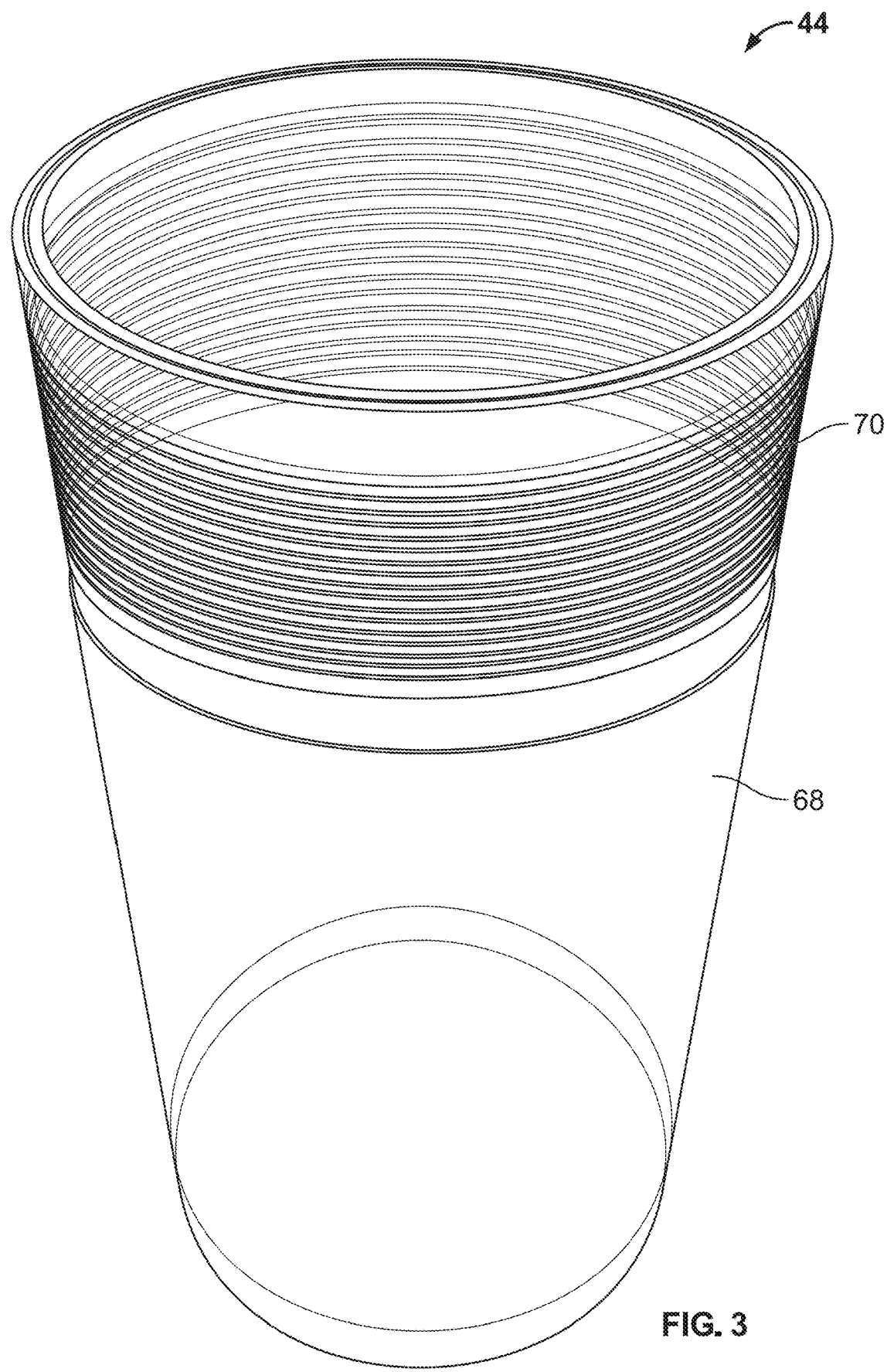
FIG. 3 is a one embodiment of an intermediary container for the seed fulfillment system.
Figure 4:
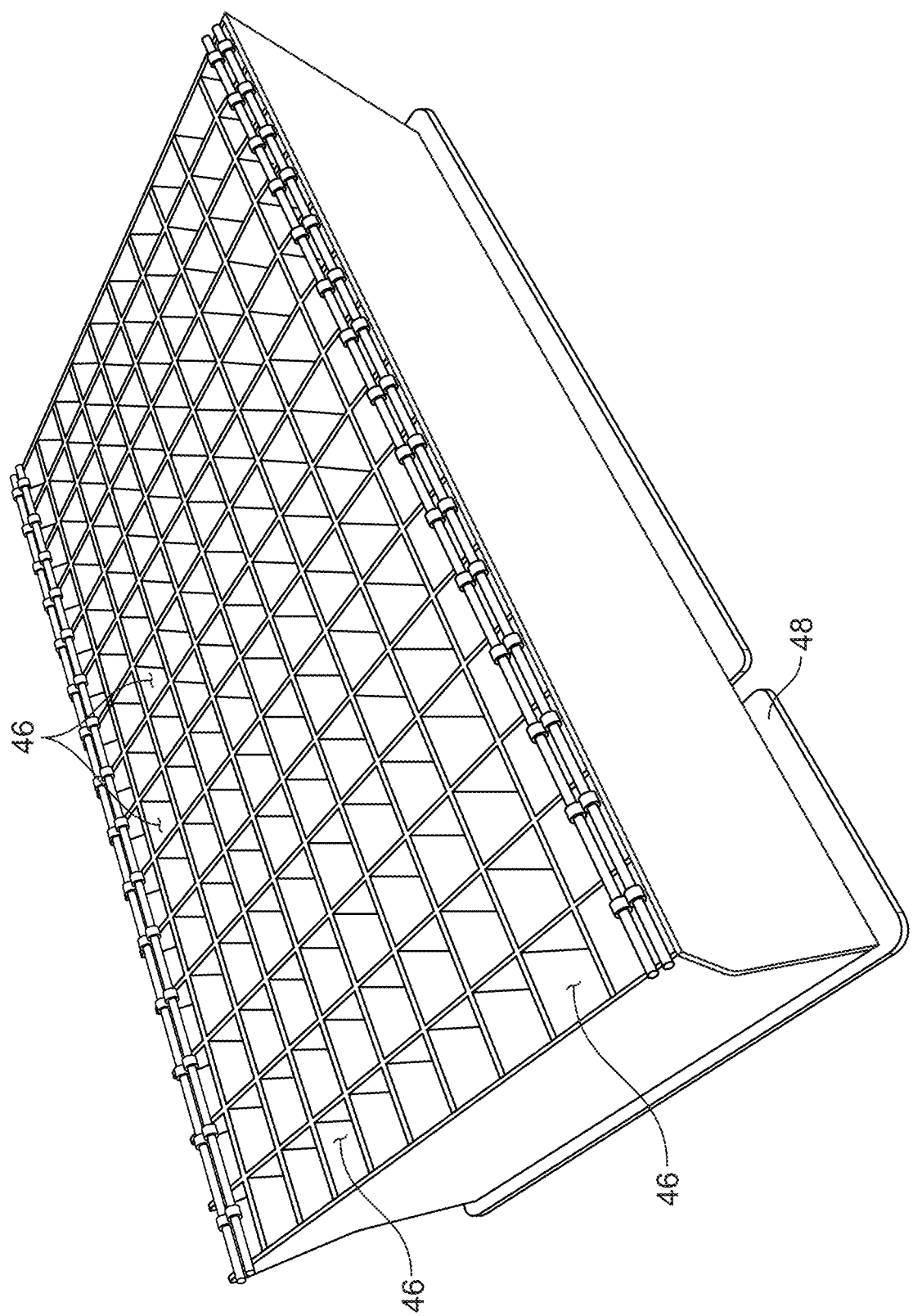
FIG. 4 is one embodiment of a shipping container for the seed fulfillment system.

Referring to FIG. 3, each of the intermediary containers 44 includes a container body 68 sized and shaped to contain a selected quantity of seeds, and a machine readable optical label 70 coupled to the container body. In other embodiments, the container body 68 may include other types of machine readable labels without necessarily departing from the scope of the present invention. In the illustrated embodiment, the machine readable optical label 70 comprises a one-dimensional or linear barcode that extends 360 degrees around a circumference of the container body 68. In particular, the one-dimensional barcodes are distinguishable by varying widths and spacing of parallel lines that extend 360 degrees around the circumference of the container body 68. Through this design and configuration, the intermediary containers 44 are machine scannable in any rotational orientation as it travels within the intermediary-container handling system 16 and the seed fulfillment system 10, as explained in more detail below.

At the intermediary-container filling system 14, the intermediary container 44 is associated with the inventory seed that is being deposited in the intermediary container. This association may be saved in the database 36 (e.g., an intermediary container database) that is accessible by the controller 22. This association may be temporary, whereby sometime after filling a corresponding cell 46 of a cassette 48 with the seeds in the intermediary container 44, the association is removed from the database 36 and the intermediary container may be recycled back to the filling system 14, as described below. As a non-limiting example, the machine readable optical label of the inventory container 52 and/or the seed package or container within the inventory container may be scanned and the machine readable optical label of with the intermediary container 44 may be scanned to associate the inventory seed in the inventory container with the seed being deposited in the particular intermediary container. This step may be performed automatically by a scanner controlled by the controller 22 at the intermediary-container filling system 14. In another embodiment, this step may be performed manually, such as by a worker, using a scanner interfaced with the controller 22.

Figure 7:
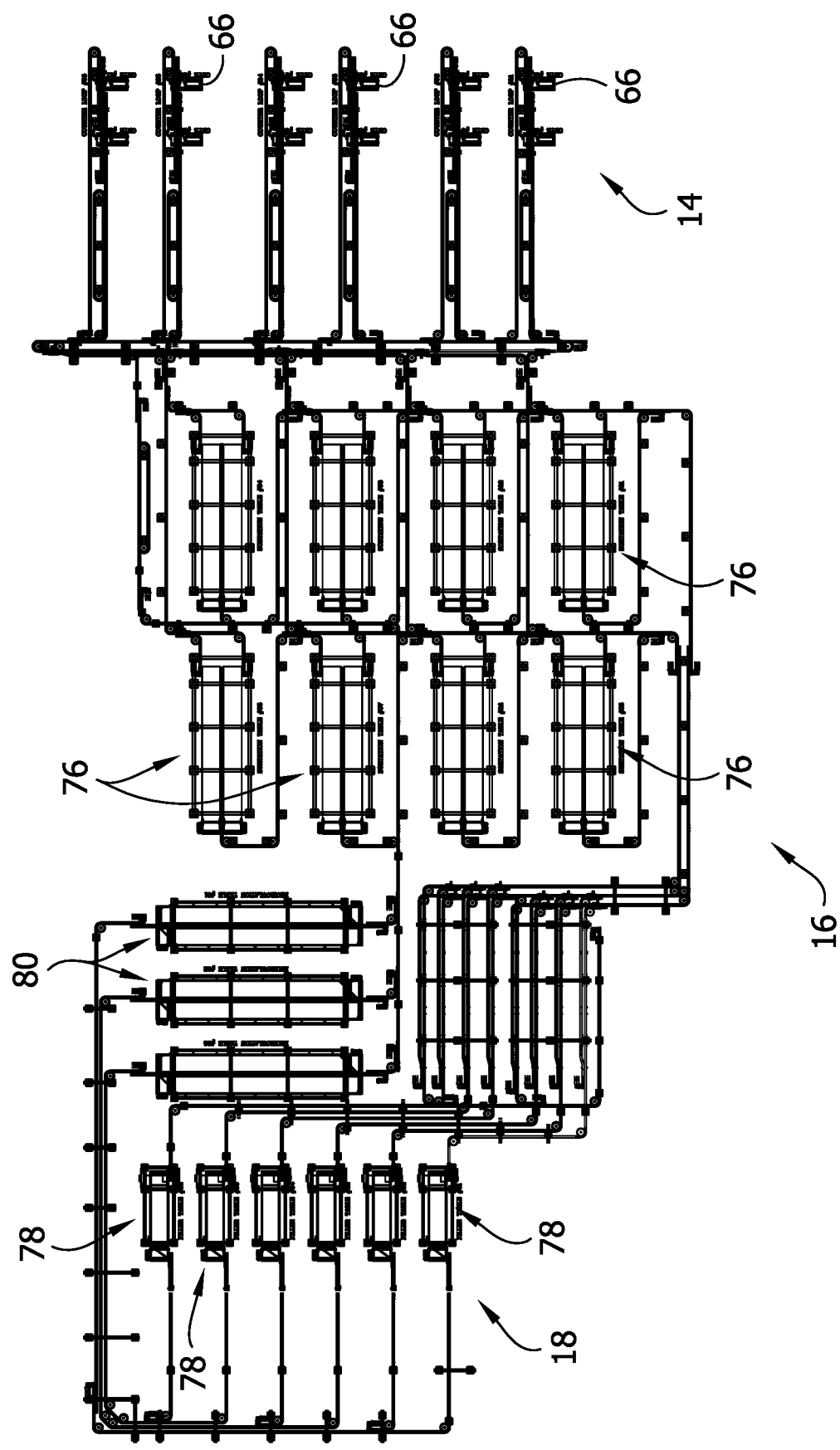
FIG. 7 is a schematic layout of intermediary-container filling system and intermediary-container handling system of the seed fulfillment system.

Referring to FIG. 7, the illustrated intermediary-container handling system 16 generally comprises at least one accumulating sortation table, generally indicated at reference numeral 76; at least one filling sortation table, generally indicated at 78; and at least one recirculation table, generally indicated at reference numeral 80. A conveyor system (e.g., a series of conveyors) moves the intermediary containers 44 from the intermediary-container filling system 14 to the at least one accumulating sortation table 76, from the at least one accumulating sortation table to the filling sortation table 78, from the filling sortation table to the recirculation table 80, and from the recirculation table back to the intermediary-container filling system.

In the illustrated embodiment, the at least one accumulating sortation table 76 comprises a group of accumulating sortation tables. The accumulating sortation tables 76 receive the filled intermediary containers 44 from the intermediary-container filling system 14 via a set of interconnected accumulation conveyors 84. Scanners 86 positioned along the accumulation conveyors 84 scan the code 70 on the intermediary containers 44 and communicate the data to the controller 22. Thus, through the use of a series of scanners 86, the controller is aware of the location of each of the filled intermediary containers 44 as they travel through the intermediary-container handling system 16. Gates or diverters are adjacent junctures of the interconnected accumulation conveyors 84. The controller 22 actuates the gates or diverters to direct the filled intermediary containers 44 along a predetermined path to one of the accumulating sortation tables 76, based on instructions from the scheduler 34. Thus, the controller 22, through use of the location data from the sensors and by actuating the gates or diverters, delivers the filled intermediary containers 44 to the selected one of the accumulating sortation tables 76. In this illustrated embodiment, any intermediary container 44 from the intermediary-container filling system 14 can be conveyed to any one of the accumulating sortation tables 76.

Figure 12:
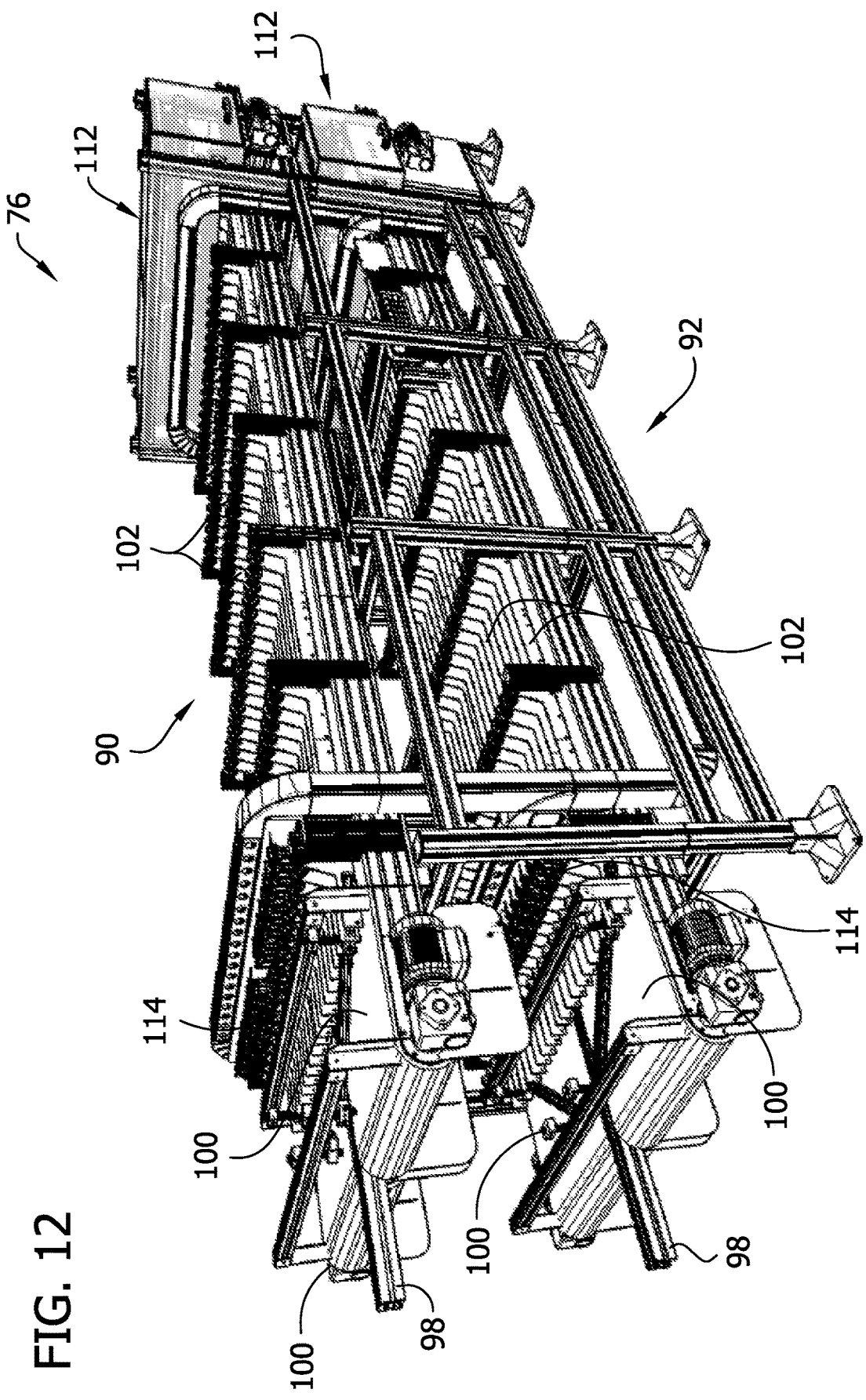
FIG. 12 is an enlarged perspective of one of the accumulating sortation tables.
Figure 13:
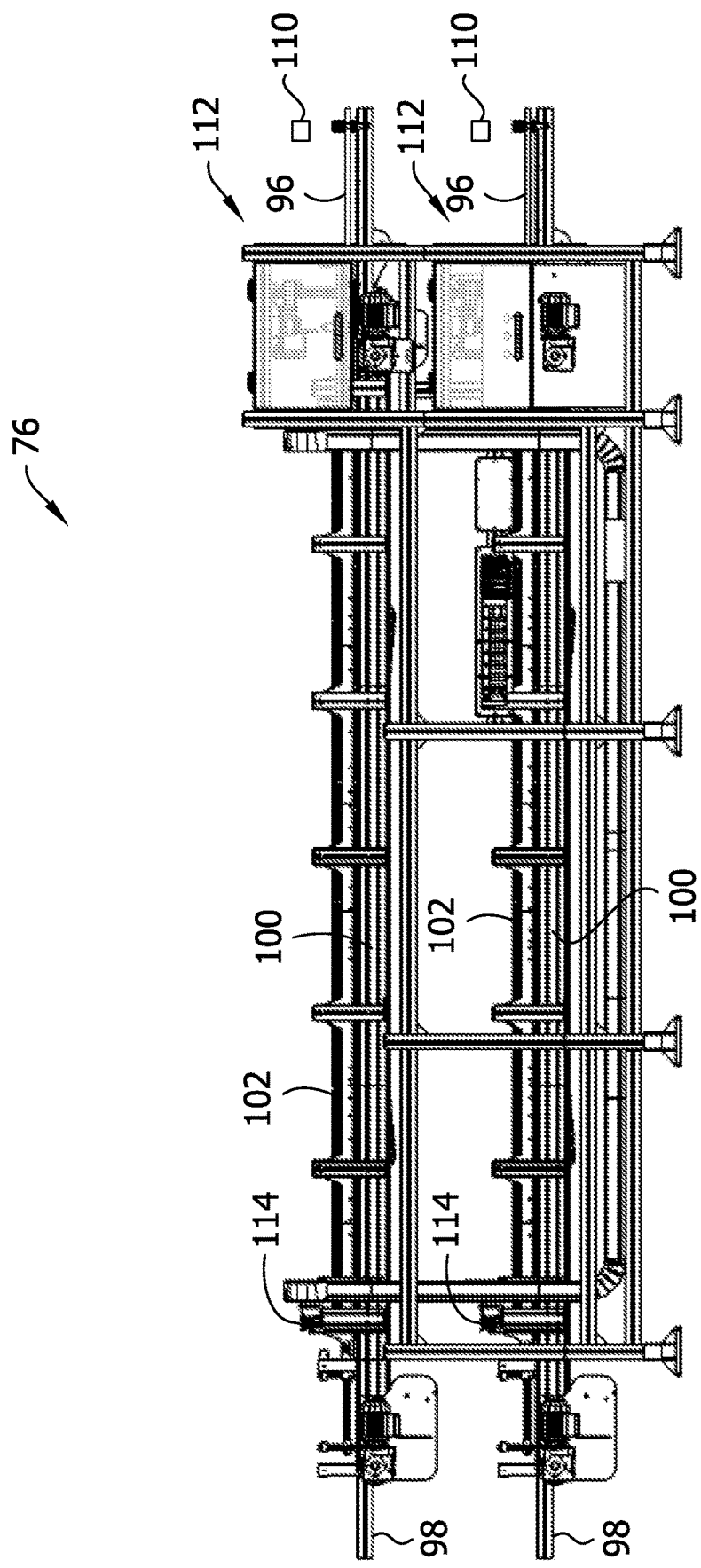
FIG. 13 is a side elevational view of the accumulating sortation table.
Figure 14:
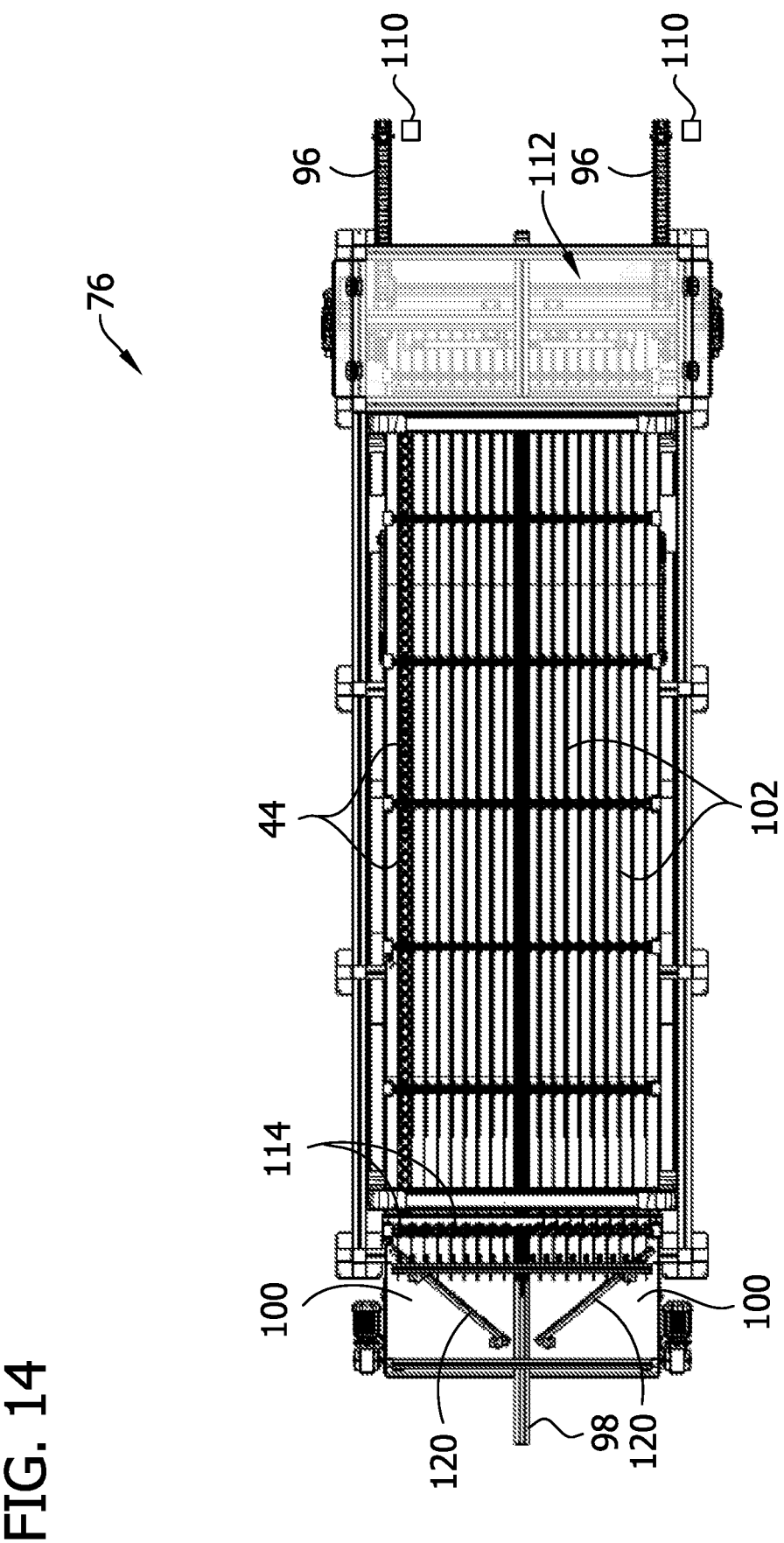
FIG. 14 is a top plan view of the accumulating sortation table.
Figure 15:
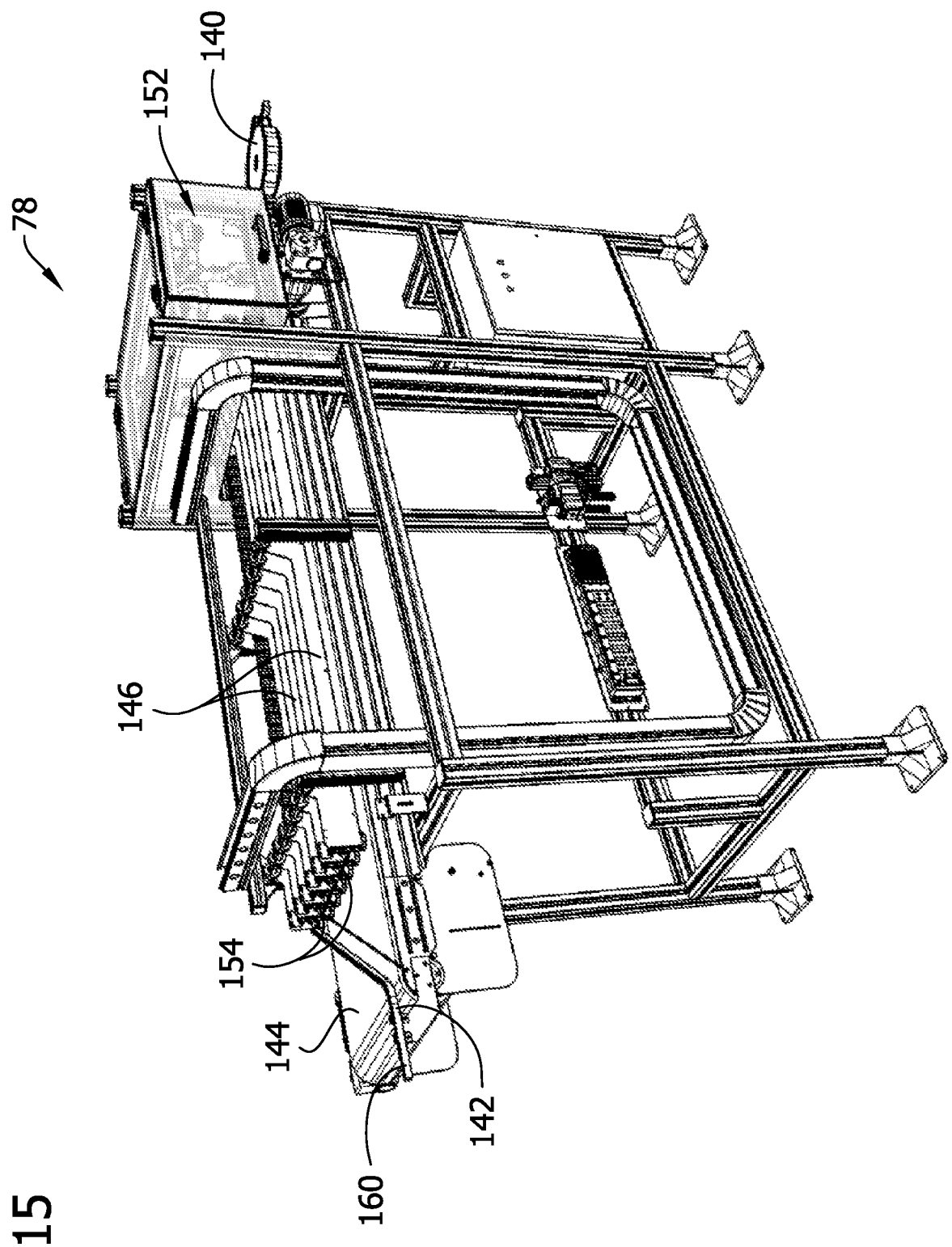
FIG. 15 is an enlarged perspective of one of the filling sortation tables.

Referring to FIGS. 12-14, each of the illustrated accumulating sortation tables 76 includes separate upper and lower sortation tables, generally indicated at reference numerals 90, 92. Accordingly, in the illustrated embodiment, the intermediary-container handling system 16 includes sixteen total accumulating sortation tables (eight accumulating sortation tables 76 each having two sortation tables 90, 92). It is understood that the intermediary-container handling system 16 may include more or less accumulating sortation tables without necessary departing from the scope of the invention. Moreover, the accumulating sortation tables 76 may have a single sortation table (i.e., one level) or more than two sortation tables (i.e., more than two levels).

Each accumulating sortation table 76 is identical in the illustrated embodiment, and therefore, only one such table will be described in detail for purposes of convenience with the understanding that the teachings apply equally to each of the queuing sortation tables. Referring to FIGS. 12 and 13, the upper and lower sortation tables 90, 92 are generally the same in structure and function. Each sortation table 90, 92 comprises an ingress 96 receiving the filled intermediary containers 44; an egress 98 through which the filled intermediary containers exit the sortation table; at least one table conveyor 100 (e.g., two parallel conveyors) moving the filled intermediary containers along a path of travel; and and a plurality of lane barriers 102 extending along the path of travel that define a plurality of lanes in which the intermediary containers travel on the table conveyor 100 from the ingress to the egress. The filled intermediary containers 44 from the intermediary-container filling system 14 enter the corresponding sortation table 90, 92 through the ingress.

The sortation table further includes a table scanner 110 and a robotic sorting mechanism, generally indicated at 112, in communication with the ingress 96. The controller 22 is in communication with the table scanner 110 and the robotic sorting mechanism 112. The table scanner 110 scans the machine readable code 70 of the filled intermediary containers 44 entering the sortation table 90, 92 and the controller 22 determines which lane each of the intermediary containers should be placed based on the instructions of the scheduler 34. The controller 22 operates the robotic sorting mechanism 112 to sequentially place each of the filled intermediary containers 44 in the desired lane as the filled intermediary containers enter the table 90, 92. In one example, the robotic sorting mechanism 112 may include a robotic arm configured to grip and move the filled intermediary containers 44. In another example, the robotic sorting mechanism 112 may include a gate or diverter to move the each filled intermediary container 44 to the desired lane. The robotic sorting mechanism 112 may be of other designs and constructions without necessary departing from the scope of the present invention.

Each sortation table 90, 92 also comprises a plurality of gates or stops 114 associated with the lanes adjacent the egress 98. Each gate 114 is associated with one of the lanes such that each lane includes a dedicated gate. The controller 22 is in communication with each gate 114 such that the controller is configured to selectively and individually open and close each gate. When a selected gate 114 is closed (e.g., via communication with the controller 22), the filled intermediary containers 44 within the lane associated with the closed gate remain in the lane and do not exit to the egress 98. The gates 114 are configured to release one intermediary container 44 at a time or remain open a selected period of time to release a selected number of containers simultaneously. Even with the conveyors 100 operating, the filled intermediary containers 44 within the closed track do not exit the sortation table 90, 92. Instead, the filled intermediary containers 44 form a line in the closed track, as shown in FIG. 14 for example. In this way, the filled intermediary containers 44 are lined up in a queue and may accumulate in the tables 90, 92, based on the instructions by the scheduler 34.

The egress 98 includes an egress lane and a dedicated conveyor configured to convey the filled intermediary container 44 along the egress lane. When the filled intermediary containers 44 are released from the lanes, the containers on the conveyor 100 are diverted to the egress lane by diverter bars 120. The released containers 44 form a single line in the egress lane and the dedicated egress conveyor move the released containers 44 away from the accumulating sortation table 76.

Figure 9:
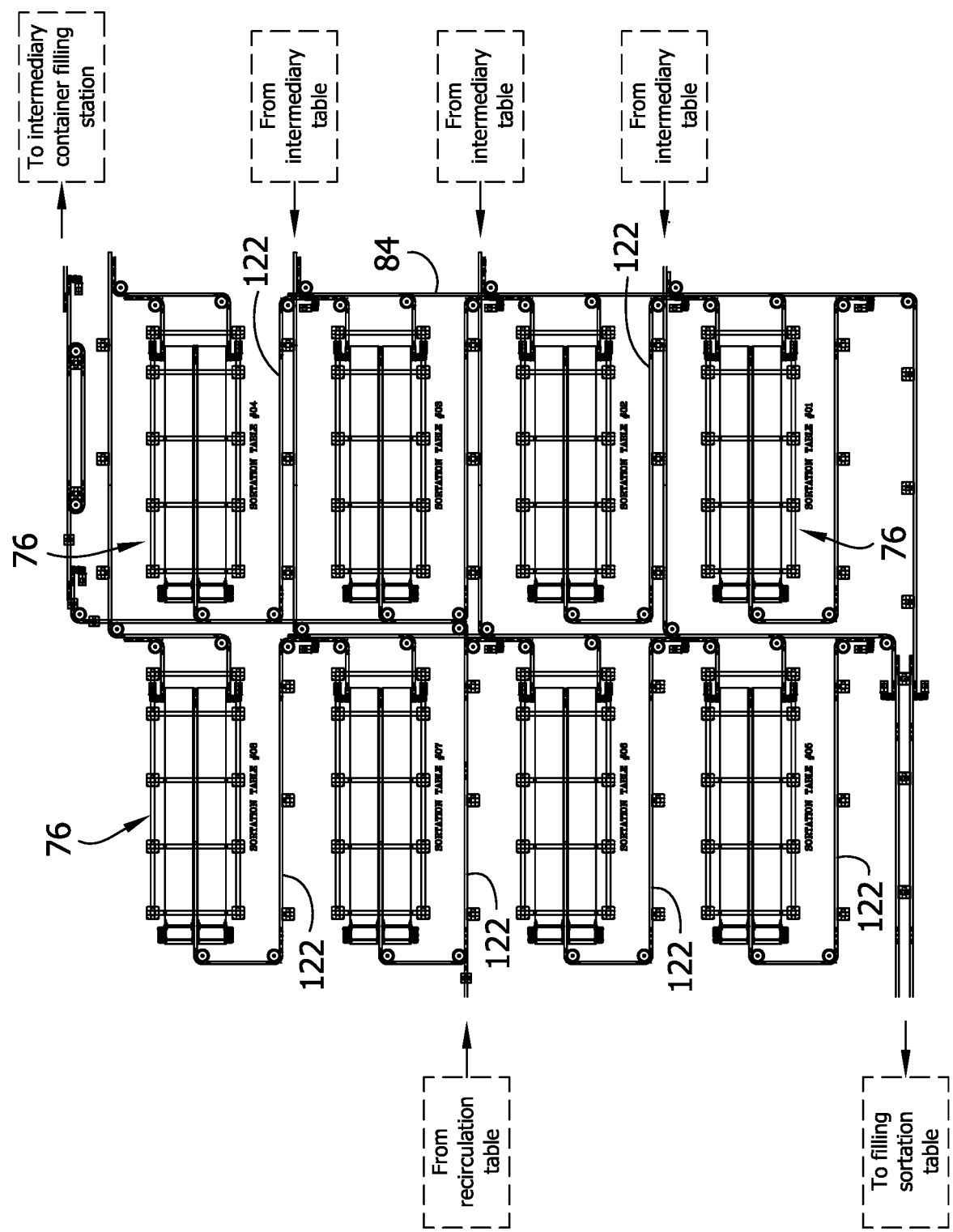
FIG. 9 is an enlarged, partial view of FIG. 7 showing accumulating sortation tables of the intermediary-container handling system.
Figure 10:
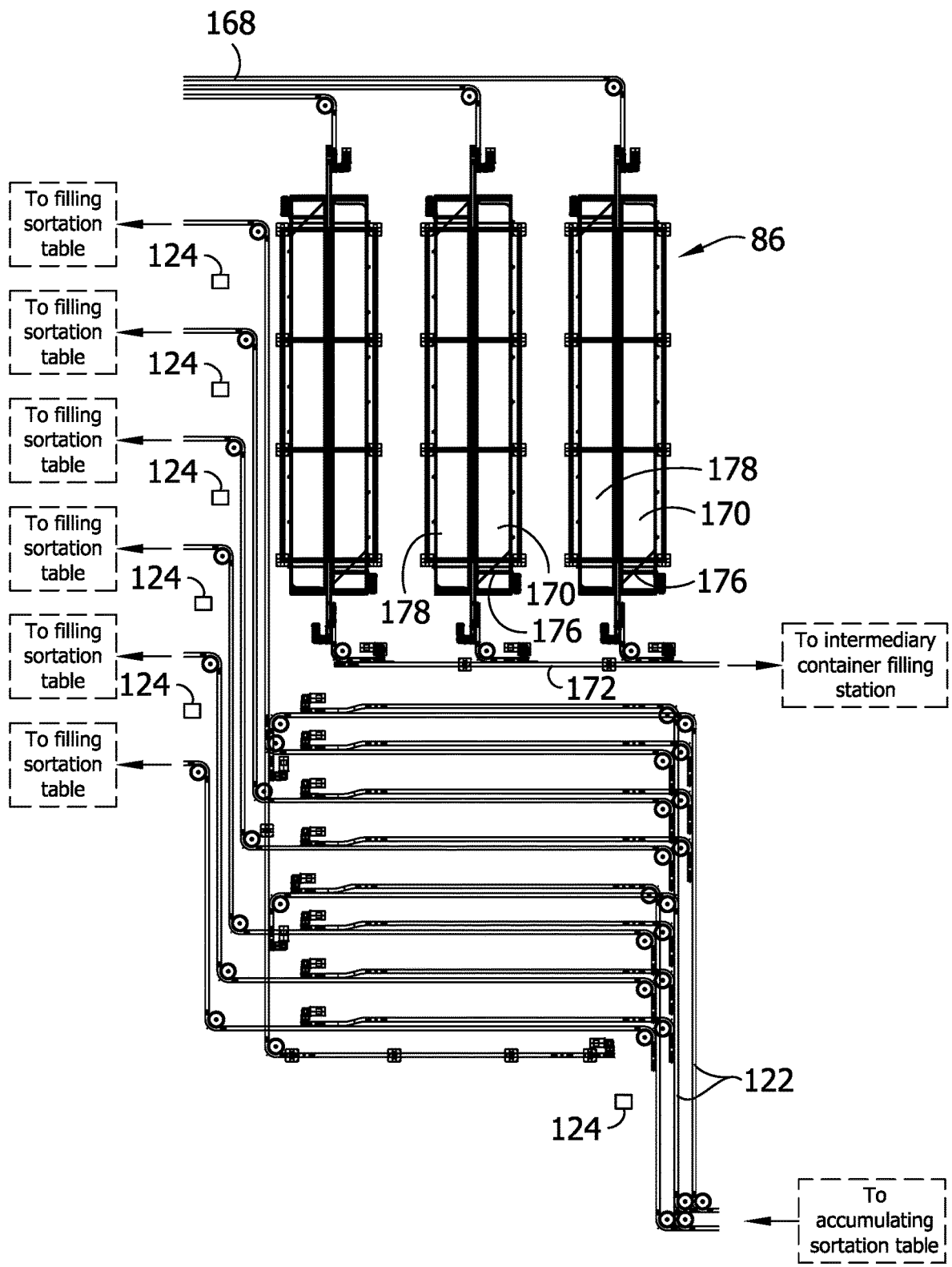
FIG. 10 is an enlarged, partial view of FIG. 7 showing recirculation tables of the intermediary-container handling system.
Figure 11:
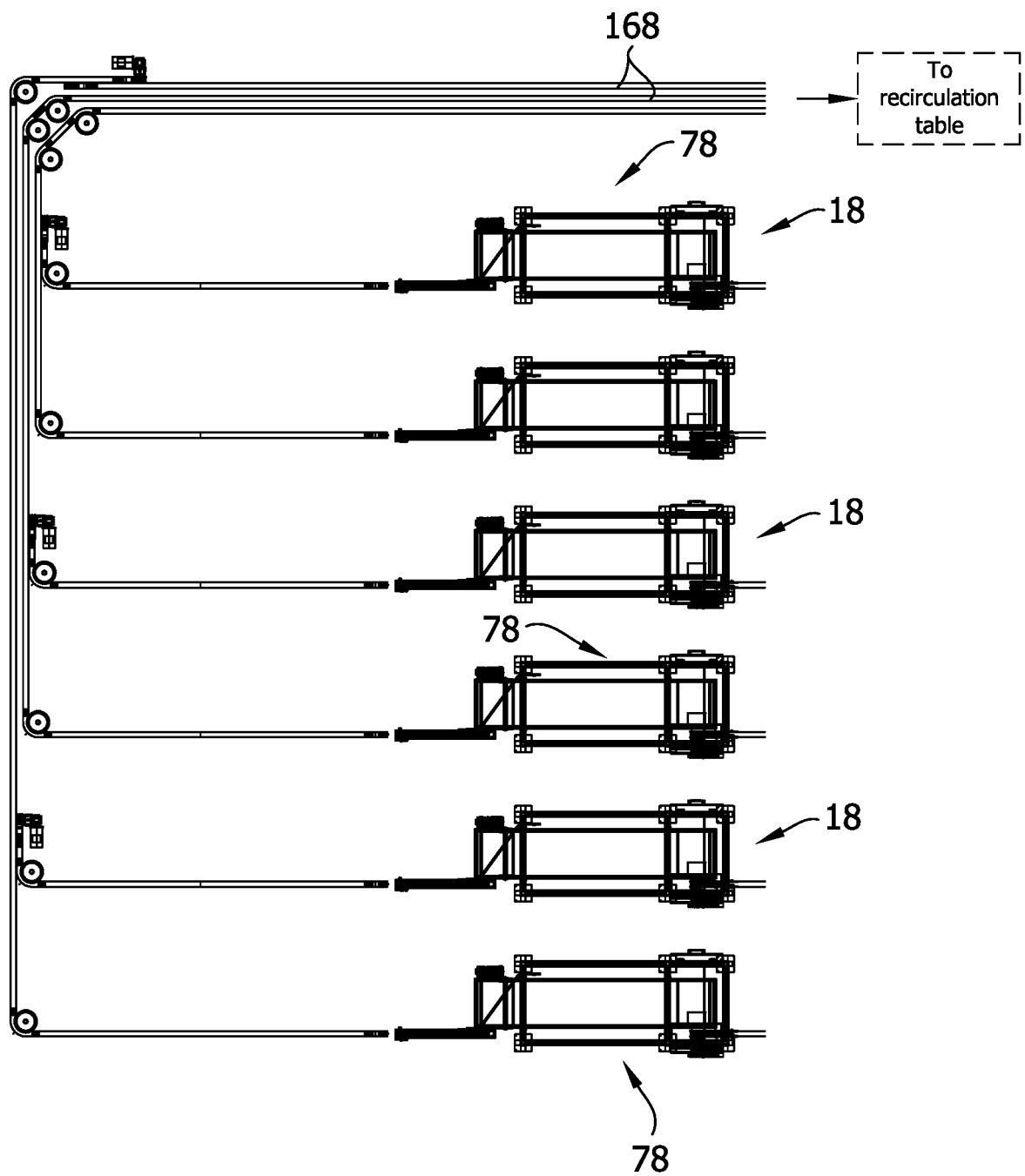
FIG. 11 is an enlarged, partial view of FIG. 7 showing filling sortation tables of the intermediary-container handling system.

Referring to FIGS. 9 and 10, from the egress 98 of the sortation tables 90, 92, a filler conveyor network conveys the filled intermediary containers 44 to the filling sortation tables 78. The filler conveyor network includes a plurality of interconnected filler conveyors 122, a plurality of filler scanners 124, and a plurality of gates or diverters at junctions of the interconnected filler conveyors. The scanners 124 positioned along the filler conveyors 122 scan the code 70 on the filled intermediary containers 44 and communicate the data to the controller 22. Thus, through the use of a series of scanners 124, the controller 22 is aware of the location of each of the filled intermediary containers 44 as they travel along the filler conveyors 122. Gates or diverters are adjacent junctures of the interconnected filler conveyors 122. The controller 22 actuates the gates or diverters to direct the filled intermediary containers 44 along a predetermined path to one of the filling sortation tables 98, based on instructions from the scheduler 34. Thus, the controller 22, through use of the location data from the sensors 124 and by actuating the gates or diverters, delivers the filled intermediary containers 44 to the selected one of the filling sortation tables 78. In this illustrated embodiment, any intermediary container 44 from the accumulating sortation tables 76 can be conveyed to any one of the filling sortation tables 78.

Each filling sortation table 78 is similar to the sortation tables 90, 92 of the accumulating sortation tables 76. In the illustrated embodiment, the intermediary-container handling system 16 includes six filling sortation tables 78. It is understood that the intermediary-container handling system 16 may include more or less filling sortation tables without necessary departing from the scope of the invention.

Each filling sortation table 78 is identical in the illustrated embodiment, and therefore, only one such table will be described in detail for purposes of convenience with the understanding that the teachings apply equally to each of the queuing sortation tables. Each filling sortation table 78 comprises an ingress 140 receiving the filled intermediary containers 44; an egress 142 through which the filled intermediary containers exit the sortation table; at least one table conveyor 144 moving the filled intermediary containers along a path of travel; and a plurality of lane barriers 146 extending along the path of travel that define a plurality of lanes in which the intermediary containers travel on the table conveyor 100 from the ingress to the egress.

The filling sortation table 78 further includes a table scanner 150 and a robotic sorting mechanism, generally indicated at 152, in communication with the ingress 140. The controller 22 is in communication with the table scanner 150 and the robotic sorting mechanism 152. The table scanner 150 scans the machine readable code 70 of the filled intermediary containers 44 entering the sortation table 78 and the controller 22 determines which lane each of the intermediary containers should be placed based on the instructions of the scheduler 34. The controller 22 operates the robotic sorting mechanism 152 to sequentially place each of the filled intermediary containers 44 in the desired lane as the filled intermediary containers enter the table 78. In one example, the robotic sorting mechanism 152 may include a robotic arm configured to grip and move the filled intermediary containers 44. In another example, the robotic sorting mechanism 152 may include a gate or diverter to move the each filled intermediary container 44 to the desired lane. The robotic sorting mechanism 152 may be of other designs and constructions without necessary departing from the scope of the present invention.

Figure 16:
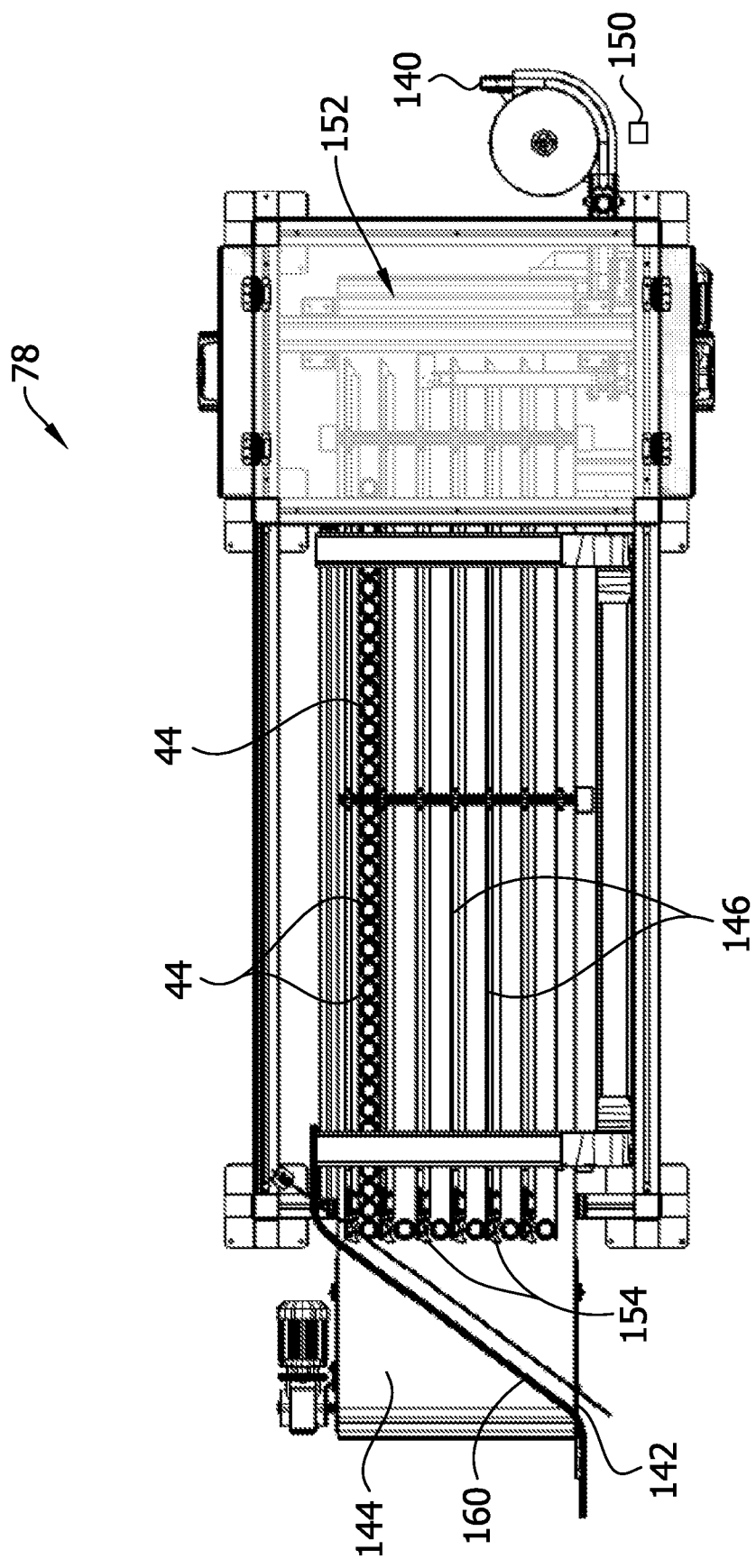
FIG. 16 is a side elevational view of the filling sortation table.
Figure 17:
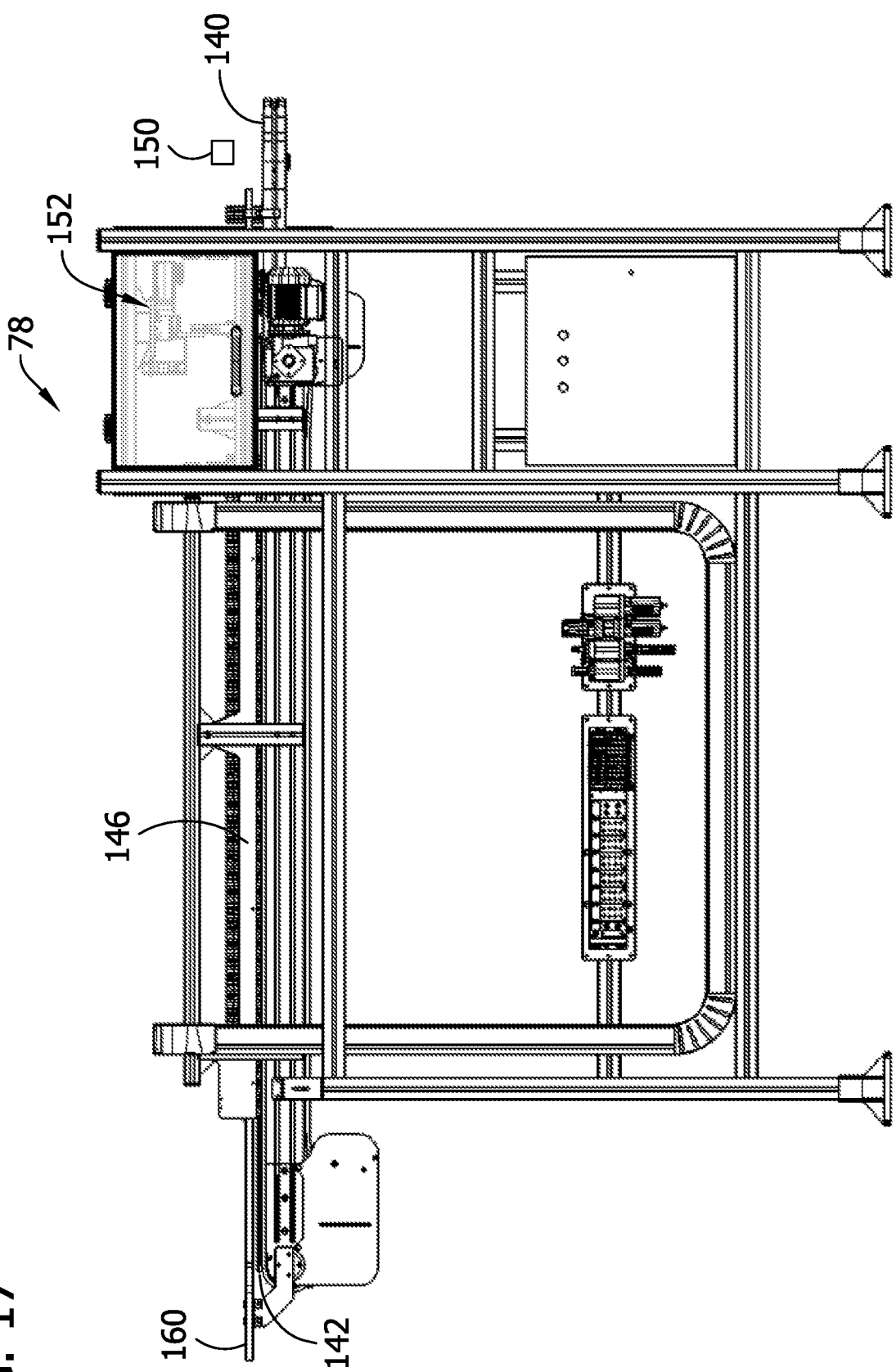
FIG. 17 is a top plan view of the filling sortation table.

The filling sortation table 78 also comprises a plurality of gates or stops 154 associated with the lanes adjacent the egress 142. Each gate 154 is associated with one of the lanes such that each lane includes a dedicated gate. The controller 22 is in communication with each gate 154 such that the controller is configured to selectively and individually open and close each gate. When a selected gate 154 is closed (e.g., via communication with the controller 22), the filled intermediary containers 44 within the lane associated with the closed gate remain in the lane and do not exit to the egress 142. The gates 154 are configured to release one intermediary container 44 at a time or remain open a selected period of time to release a selected number of containers simultaneously. Even with the conveyors 144 operating, the filled intermediary containers 44 within the closed track do not exit the sortation table 78. Instead, the filled intermediary containers 44 form a line in the closed track, as shown in FIG. 16 for example. In this way, the filled intermediary containers 44 are lined up in a queue and may accumulate in the tables 78, based on the instructions by the scheduler 34.

The egress 142 includes an egress lane configured to convey the filled intermediary container 44 along the egress lane. When the filled intermediary containers 44 are released from the lanes, the containers on the conveyor 100 are diverted to the egress lane by a diverter bar 160. The released containers 44 form a single line in the egress lane and the conveyor 144 moves the released containers 44 away from the filling sortation table 78 and to the shipping-container loading system 18.

In the illustrated embodiment, the shipping-container loading system 18 is configured to deposit the seeds from the received intermediary container 44 into the desired cell 46 of the cassettes 48 present at the shipping-container loading system, based on the instructions from the scheduler 34. In one example, the shipping-container loading system 18 includes a robotic arm or other mechanism that grips and inverts the received container 44 to pour the seeds into the desired cell 46. In other embodiments, each shipping container 48 may include a packet or tray for the seeds, and may not include individual cells like the illustrated cassettes.

The shipping-container handling system 20 generally comprises a robot system (e.g., an overhead robot system) configured to pick up, move, and deliver the cassettes 48 to the shipping-container loading system 18. Each cassette 48 may include one or more machine readable optical label, such as a bar code (e.g., matrix bar code, such as QR codes) that includes information identifying the cassette. The database 36 (e.g., shipping-container database)—may associate the information in the machine readable optical label of the cassette 48 with the desired seed to be loaded in the cells 46 of the cassette. The construction of the shipping-container handling system 20 may be similar to the inventory handling system 12, with the teachings set forth above with respect to the inventory handling system 12 applying equally to the shipping-container handling system. The shipping-container handling system 20 also includes one or more conveyors for conveying the cassettes 48 to and from the shipping-container loading system 18. The cassettes 48 may be moved via conveyors from the shipping-container loading system 18 back to the shipping-container handling system 20, such as if the cassettes are not ready for shipping, or to the shipping-container packaging system 30 for shipment.

After depositing the seeds from the intermediary container 44 into the desired cell 46 of the cassette 48, the intermediary container is conveyed to the at least one recirculation table 80, such as by one or more conveyors 168. In the illustrated embodiment, the intermediary-container handling system 16 includes three recirculation tables 80. The recirculation tables 80 each include a feeding conveyor 170 that moves the empty intermediary containers 44 toward a conveyor 172 that delivers the containers to the container filling system 14. A diverter 176 at the end of the feeding conveyor 170 directs the intermediary containers 44 toward the empty-container conveyor 172. The containers 44 may be selectively fed to the empty-container conveyor 172 via a gate or other mechanism. If the empty-container conveyor becomes backed up with intermediary containers 44 or a gate closes access to the empty-container conveyor 172 such that the intermediary containers cannot exit the recirculation table 80, the intermediary containers are conveyed on a redirecting conveyor 178 that conveys the intermediary container 44 in a direction opposite the direction of the feeding conveyor. In this way, the empty intermediary containers 44 are constantly moving on the recirculation table 80 to inhibit bottle-necking.

Modifications and variations of the disclosed embodiments are possible without necessarily departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A seed fulfillment system comprising:
a seed inventory handling system configured to handle inventory containers containing different seed types;
an intermediary-container filling system; wherein the seed inventory handling system is configured to transport at least one of the inventory containers to the intermediary-container filling system, and wherein the intermediary-container filling system is configured to remove selected seeds from the at least one of the inventory containers and fill at least one intermediary container with the removed seeds, wherein the at least one intermediary container includes a body configured to contain the seeds therein;
a shipping-container loading system configured to remove the seeds from the at least one intermediary container and load at least one shipping container with the seeds removed from the at least one intermediary container; and
an intermediary-container handling system configured to convey the filled at least one intermediary container from the intermediary-container filling system to the shipping-container loading system and then convey the at least one intermediary container from the shipping-container loading system back to the intermediary-container filling system, after the seeds are removed from the at least one intermediary container at the shipping-container loading system.

2. The seed fulfillment system set forth in claim 1, wherein the intermediary-container handling system comprises an accumulating sortation table configured to receive the filled at least one intermediary container from the intermediary-container filling system, and wherein the accumulating sortation table includes a plurality of individual lanes in which the at least one intermediary container is receivable.

3. The seed fulfillment system set forth in claim 2, wherein the accumulating sortation table comprises a plurality of accumulating sortation tables.

4. The seed fulfillment system set forth in claim 1, wherein the seed inventory handling system comprises a robot configured to pick up, move and deliver the at least one of the inventory containers to the intermediary-container filling system.

5. The seed fulfillment system set forth in claim 4, wherein the robot of the seed inventory handling system comprises a robotic gantry.

6. The seed fulfillment system set forth in claim 4, further comprising the at least one of the inventory containers, wherein the at least one of the inventory containers includes a machine readable label configured to associate information relating to type of seed contained in the at least one of the inventory containers.

7. The seed fulfillment system set forth in claim 1, further comprising seed containers sized and shaped to be received in the at least one of the inventory containers, wherein the seed containers each include a machine readable label configured to associate information relating to the type of seed contained in the seed container.

8. The seed fulfillment system set forth in claim 7, further comprising a seed container handling system configured to remove a selected one or more of the seed containers from the at least one of the inventory containers.

9. The seed fulfillment system set forth in claim 8, wherein the seed container handling system includes a robotic arm configured to grab the selected one or more of the seed containers from the at least one of the inventory containers.

10. The seed fulfillment system set forth in claim 9, wherein the seed container handling system further includes a conveyor configured to convey the selected one or more seed containers removed from the at least one of the inventory containers to the intermediary-container filling system.

11. The seed fulfillment system set forth in claim 10, wherein the seed container handling system further includes a conveyor configured to convey the selected one or more seed containers from the intermediary-container filling system to a seed container holding area to be placed back in the corresponding at least one of the inventory containers from which it was removed.

12. The seed fulfillment system set forth in claim 1, wherein the intermediary-container filling system comprises a seed counter configured to a selected quantity of the seeds removed from the at least one of the inventory containers and to fill the at least one intermediary container with the selected quantity of counted seeds.

13. The seed fulfillment system set forth in claim 1, further comprising the at least one shipping container, wherein the at least one shipping container comprises a cassette with a plurality of cells for receiving seeds from the at least one intermediary container.

14. The seed fulfillment system set forth in claim 13, wherein the shipping-container loading system is configured to load the plurality of the cells of the cassette with seeds from respective selected ones of the at least one intermediary container.

15. The seed fulfillment system set forth in claim 1, wherein the intermediary-container handling system comprises a conveyor configured to convey the filled at least one intermediary container to the shipping-container loading system.

16. The seed fulfillment system set forth in claim 15, wherein the intermediary-container handling system comprises one or both of an accumulating sortation table and a filling sortation table.

17. The seed fulfillment system set forth in claim 1, further comprising a plurality of intermediary containers, wherein each of the plurality of intermediary containers comprises a container body and a machine readable label on the body configured to associate the intermediary container with the type of seed in the intermediary container.

18. The seed fulfillment system set forth in claim 17, further comprising:
- a conveyor system configured to convey the intermediary containers from the intermediary-container filling system to the intermediary-container handling system; and
- a plurality of scanners configured to scan machine readable labels on the intermediary containers.

19. The seed fulfillment system set forth in claim 17, wherein the machine readable labels on the intermediary containers includes a bar code extending 360 degrees about a circumference of the container body.

20. The seed fulfillment system set forth in claim 1, further comprising a controller in communication with and controlling operation of the seed inventory handling system, the intermediary-container filling system, the shipping-container loading system, and the intermediary-container handling system.

21. The seed fulfillment system set forth in claim 1, wherein the intermediary-container handling system includes at least one recirculation table configured to receive the at least one intermediary container from the shipping-container loading system after the seeds are removed from the at least one intermediary container at the shipping-container loading system, and wherein the at least one recirculation table includes a feeding conveyor configured to move the at least one intermediary container to the intermediary-container filling system and a redirecting conveyor configured to convey the at least one intermediary container in an opposite direction than the feeding conveyor.

\* \* \* \* \*